United States Patent
Kobayashi et al.

(10) Patent No.: US 11,178,344 B2
(45) Date of Patent: Nov. 16, 2021

(54) HEAD-MOUNTED DISPLAY APPARATUS, DISPLAY SYSTEM, AND METHOD OF CONTROLLING HEAD-MOUNTED DISPLAY APPARATUS

(71) Applicant: SEIKO EPSON CORPORATION, Tokyo (JP)

(72) Inventors: Shinichi Kobayashi, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/249,996

(22) Filed: Jan. 17, 2019

(65) Prior Publication Data

US 2019/0222774 A1 Jul. 18, 2019

(30) Foreign Application Priority Data

Jan. 18, 2018 (JP) .............................. JP2018-006080

(51) Int. Cl.
| | |
|---|---|
| *H04N 5/265* | (2006.01) |
| *H04N 5/262* | (2006.01) |
| *G06F 3/01* | (2006.01) |
| *H04N 5/232* | (2006.01) |
| *G06F 3/147* | (2006.01) |
| *G02B 27/01* | (2006.01) |
| *G09G 5/377* | (2006.01) |
| *G06F 3/03* | (2006.01) |

(52) U.S. Cl.
CPC ......... *H04N 5/265* (2013.01); *G02B 27/0172* (2013.01); *G06F 3/011* (2013.01); *G06F 3/012* (2013.01); *G06F 3/0304* (2013.01); *G06F 3/147* (2013.01); *G09G 5/377* (2013.01); *H04N 5/23232* (2013.01); *H04N 5/2621* (2013.01); *G09G 2320/0693* (2013.01); *G09G 2340/0464* (2013.01); *G09G 2340/125* (2013.01); *G09G 2358/00* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 8,823,798 | B2 * | 9/2014 | Bernal | G06K 9/00228 |
| | | | | 348/149 |
| 9,571,785 | B2 * | 2/2017 | Farrell | H04N 9/8227 |
| 10,102,758 | B1 * | 10/2018 | Beaurepaire | G06Q 10/08355 |
| 10,181,178 | B2 * | 1/2019 | Cutler | G06T 7/50 |
| 2012/0206452 | A1 * | 8/2012 | Geisner | H04S 7/304 |
| | | | | 345/419 |

(Continued)

FOREIGN PATENT DOCUMENTS

JP 2002-142214 A 5/2002

*Primary Examiner* — Gelek W Topgyal
(74) *Attorney, Agent, or Firm* — Oliff PLC

(57) ABSTRACT

To provide HMD including an image display unit worn by a user on a head and configured to display an image, a camera provided in the image display unit and configured to capture an image in a predetermined direction relative to the image display unit, and a control unit configured to specify a non-display region in an imaging range of the camera, perform a process of lowering a clarity of the non-display region on captured image data of the camera, and output the processed captured image data.

16 Claims, 11 Drawing Sheets

(56) References Cited

U.S. PATENT DOCUMENTS

| | | | |
|---|---|---|---|
| 2015/0220777 A1* | 8/2015 | Kauffmann | G06K 9/00362 |
| | | | 382/103 |
| 2015/0296170 A1* | 10/2015 | Farrell | H04N 9/8227 |
| | | | 386/254 |
| 2016/0284051 A1* | 9/2016 | Koga | G06T 11/206 |
| 2017/0301067 A1* | 10/2017 | Cutler | G06T 7/50 |
| 2019/0042851 A1* | 2/2019 | Varadarajan | G06K 9/00771 |

* cited by examiner

HEAD-MOUNTED DISPLAY APPARATUS, DISPLAY SYSTEM, AND METHOD OF CONTROLLING HEAD-MOUNTED DISPLAY APPARATUS

BACKGROUND

1. Technical Field

The invention relates to a head-mounted display apparatus, a display system, and a method of controlling the head-mounted display apparatus.

2. Related Art

In the related art, there is known a device or a system configured to transmit an image captured by a camera over the Internet or the like. As one example, JP-A-2002-142214 discloses a configuration where a video imaged by a monitoring camera configured to monitor a person is transmitted to a television monitor or a computer over the Internet.

In a case where a captured image where a matter not to be captured is captured or may be captured is used, consideration should be given to the image. For example, JP-A-2002-142214 describes a technology in which a portion of the video capturing a human is masked by using a mosaic process, or the like to protect privacy. The system described in JP-A-2002-142214 uses a so-called monitoring camera, and therefore, an imaging range or a subject is fixed. As a result, a portion that should be masked in the captured image can be specified. On the other hand, in a case where the imaging range, an imaging direction, or a subject to be captured is changed depending on a device configuration or an environment, it is difficult to appropriately utilize an image that may have captured a matter not to be captured. Therefore, there is needed a cumbersome task such as a determination as to whether a matter not to be captured is captured through a human visual observation.

SUMMARY

In view of the above circumstance, an advantage of some aspects of the invention is to appropriately utilize a captured image that may contain an image a matter not to be captured, in a system or a device utilizing the captured image.

To resolve the above problems, a head-mounted display apparatus according to a first aspect of the invention includes a display unit worn by a user on a head, and configured to display an image, an imaging unit provided in the display unit, and configured to capture an image in a predetermined direction relative to the display unit, and a control unit configured to specify a non-display region in an imaging range of the imaging unit, perform a process of lowering a clarity of the non-display region on captured image data of the imaging unit, and output the processed captured image data.

It is preferable that, by rendering a non-display region a region where a matter not to be captured is caught in the captured image data of the imaging unit, a process of lowering a clarity of the non-display region is performed. As a result, it is possible to obtain the captured image data where the clarity of the image of the matter not to be captured is lowered. Therefore, it is possible to appropriately utilize the captured image that may contain the image of the matter not to be captured.

Further, it is preferable that the apparatus includes a storage unit configured to store non-display information for specifying a non-display object, and the control unit specifies the non-display region, based on the non-display information.

According to this configuration, the non-display region on which the clarity lowering process is to be performed is specified based on the non-display information stored in the storage unit. As a result, it is possible to appropriately specify the non-display region that may contain the image of the matter not to be captured.

Further, it is preferable that the control unit specifies, as the non-display region, a region where an image of the non-display object is included in the captured image data of the imaging unit, in an imaging range of the imaging unit.

According to the configuration, the region where the non-display object is caught in the captured image data is subject to the clarity lowering process, and thus, it is possible to appropriately conceal and protect the image of the matter not to be captured.

Further, it is preferable that the non-display information stored in the storage unit includes information indicating at least one of a position and a direction of the non-display object.

According to the configuration, based on the information indicating the position and/or the direction of the non-display object, the non-display region can be appropriately specified in the captured image data.

Further, it is preferable that the non-display information stored in the storage unit includes information for specifying a distance of the non-display object from the imaging unit.

According to the configuration, with the distance from the imaging unit being a reference, the non-display region can be appropriately specified.

Further, it is preferable that the non-display object is a pre-set matter, and the non-display information stored in the storage unit includes information for detecting an appearance of the non-display object from the captured image data of the imaging unit.

According to the configuration, in a case where the appearance of the matter set previously as the non-display object is included in the captured image data, the clarity of the non-display object of the captured image data is lowered, and thus, it is possible to prevent or restrain a visual recognition of the non-display object. Examples of the non-display object may include a printed material, a notice, a written object in which information to be concealed is printed, a computer display, and the like. The information to be concealed includes information about privacy of an individual, and private information, and specifically includes a face of a person, a body, a clothing, a name card, a business card, a notice on which an individual name is listed, and the like. Further, the non-display object to be protected as secret information includes a machine and an equipment itself, a design drawing, or the like.

Further, it is preferable that the apparatus includes a communication unit, and the control unit receives the non-display information by the communication unit from an external device, and stores the received non-display information into the storage unit.

According to the configuration, the non-display information appropriate to the process of the captured image data can be utilized.

Further, it is preferable that the apparatus includes a detection unit configured to detect a position of the display unit, and the control unit specifies the position of the display unit from a detection result of the detection unit, and based on the position of the display unit and the non-display information, detects the non-display region in the captured image data.

According to the configuration, it is possible to specify the non-display region that may contain the image of the matter not to be captured to correspond to the position of the display unit. As a result, in a configuration where the imaging unit can move, the captured image that may contain the image of the matter not to be captured can be appropriately utilized.

Further, it is preferable that the imaging unit outputs first captured image data captured at a first imaging resolution and second captured image data captured at a second imaging resolution lower than the first imaging resolution, and in a process of lowering a clarity of the non-display region, the control unit replaces the non-display region in the first captured image data with an image of a corresponding region in the second captured image data.

According to the configuration, by the process of partially replacing the image, the clarity of the non-display region can be lowered.

Further, it is preferable that a map data including at least a part of a range where the display unit can move is provided, and the control unit specifies the non-display region in the map data.

According to the configuration, by utilizing the map data, the non-display region can be easily specified.

Further, it is preferable that the control unit creates the map data of the range where the display unit can move, and specifies the non-display region in the created map data.

According to the configuration, the map data is created where necessary, and the map data is utilized to easily specify the non-display region.

Further, it is preferable that the imaging unit outputs first captured image data captured at a first imaging resolution and second captured image data captured at a second imaging resolution lower than the first imaging resolution, and in a process of lowering a clarity of the non-display region, the control unit replaces the first captured image data including an image of the non-display object with the second captured image data.

According to the configuration, by the process of replacing the image, the clarity of the entire captured image including the non-display region can be lowered.

Further, it is preferable that in a process of lowering a clarity of the non-display region, the control unit controls an imaging condition of the imaging unit so that the imaging unit executes capturing to create captured image data having a portion different in clarity.

According to the configuration, the clarity of the captured image data is lowered by controlling a condition that the imaging unit captures an image, and thus, the imaging process of the captured image data can be simplified or omitted. Thus, it is possible to alleviate a process load.

Further, it is preferable that the apparatus includes an operation unit configured to receive an operation, and in a case where the non-display object is specified in an imaging range of the imaging unit through an operation received by the operation unit, the control unit creates the non-display information, based on at least one of a position and a direction of the specified non-display object.

According to the configuration, the non-display information is created according to the operation, and thus, it is possible to appropriately set a target on which the clarity lowering process is to be performed in the captured image data.

Further, to resolve the above problems, a display system according to a second aspect of the invention includes a head-mounted display apparatus and a server, wherein the server includes a server storage unit configured to store non-display information for specifying a non-display object, and a transmitting unit configured to transmit the non-display information stored in the server storage unit to the head-mounted display apparatus, and the head-mounted display apparatus includes a display unit worn by a user on a head, and configured to display an image, an imaging unit provided in the display unit, and configured to capture an image in a predetermined direction relative to the display unit, a communication unit, a storage unit configured to store the non-display information received by the communication unit from the server, and a control unit configured to specify a non-display region in an imaging range of the imaging unit, based on the non-display information stored in the storage unit, perform a process of lowering a clarity of the non-display region on captured image data of the imaging unit, and output the processed captured image data.

According to the configuration, by the head-mounted display apparatus, by rendering a non-display region a region where a matter not to be captured is caught in the captured image data of the imaging unit, a process of lowering a clarity of the non-display region is performed. Thus, it is possible to obtain the captured image data where the clarity of the image of the matter not to be captured is lowered. Further, the head-mounted display apparatus can receive the non-display information from the server, and thus, it is possible to utilize the non-display information appropriate to the process of the captured image data. Thus, it is possible to appropriately utilize the captured image that may contain the image of the matter not to be captured.

Further, to resolve the above problems, a method of controlling a head-mounted display apparatus according to a third aspect of the invention is a method of controlling a head-mounted display apparatus including a display unit worn by a user on a head, and configured to display an image. The method includes the steps of capturing, by an imaging unit provided in the display unit, an image in a predetermined direction relative to the display unit, and specifying a non-display region in an imaging range of the imaging unit, performing a process of lowering a clarity of the non-display region on the captured image data of the imaging unit, and outputting the processed captured image data.

It is preferable that, by rendering a non-display region a region where a matter not to be captured is caught in the captured image data of the imaging unit, a process of lowering a clarity of the non-display region is performed. As a result, it is possible to obtain the captured image data where the clarity of the image of the matter not to be captured is lowered. Therefore, it is possible to appropriately utilize the captured image that may contain the image of the matter not to be captured.

The invention can be also realized in various types of modes other than the above-described head-mounted display apparatus, display system, and method of controlling the head-mounted display apparatus. For example, some aspects of the invention may be achieved by a program for executing the control method described above by a computer, a recording medium recording the program, a server device configured to deliver the program, a transmission medium configured to transmit the program, a data signal configured to embody the program within a carrier wave, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Exemplary Embodiment 1-1. Configuration of Display System

Figure 1:
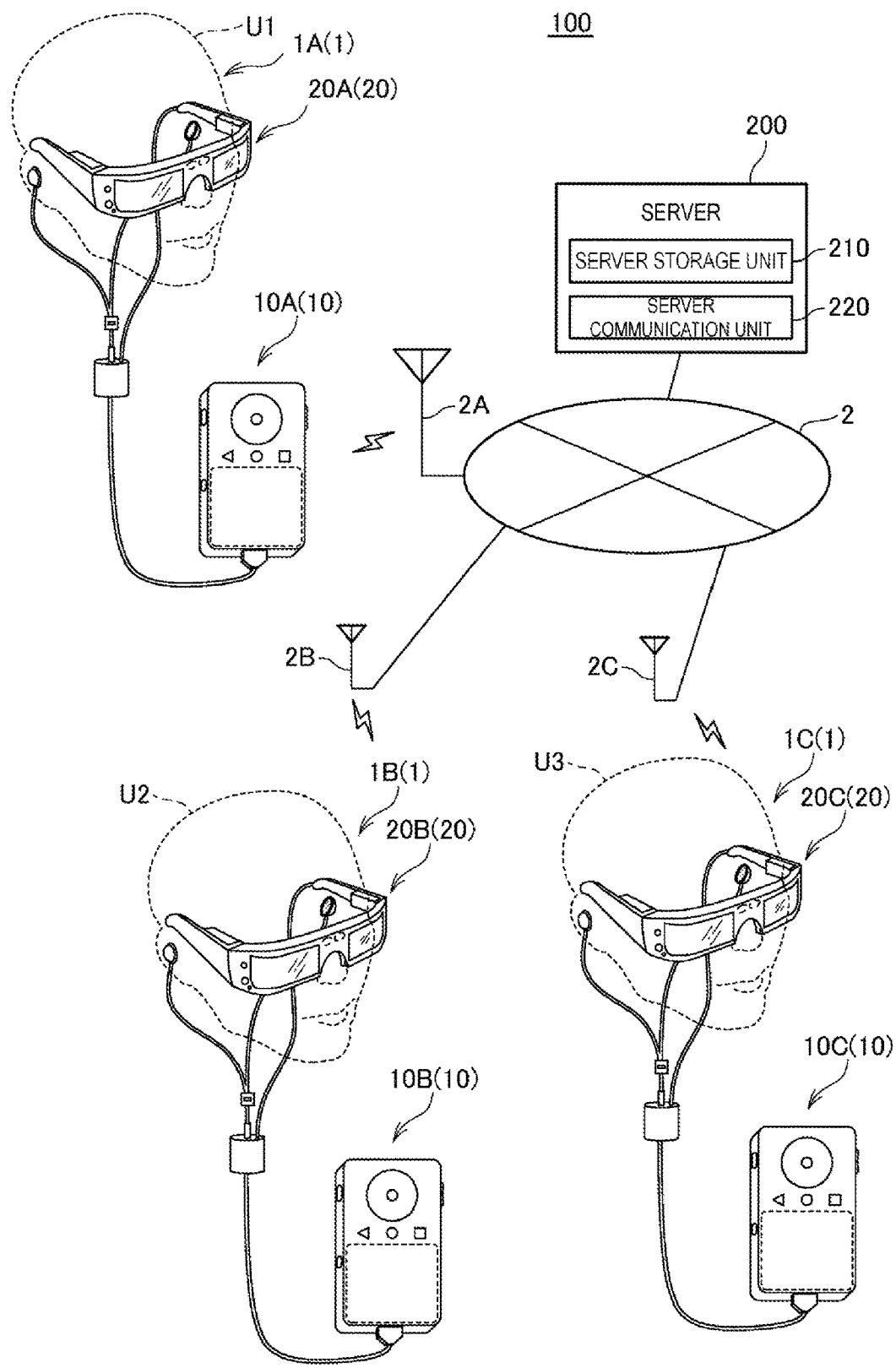
FIG. 1 is a configuration diagram of a display system according to First Exemplary Embodiment.

FIG. 1 is a schematic configuration diagram of a display system 100 according to an exemplary embodiment to which the invention is applied.

The display system 100 includes a plurality of Heat Mounted Displays (HMDs) 1 and a server 200, and the HMD 1 and the server 200 are coupled via a communication network 2 to communicate with each other.

There is no limit to the number of HMDs 1 included in the display system 100, and FIG. 1 illustrates three HMDs 1A, 1B, and 1C as one example. The HMDs 1A, 1B, and 1C of the display system 100 has a common configuration. Unless otherwise provided with a distinction, the HMDs 1A, 1B, and 1C are referred to as the HMD 1.

As illustrated in FIG. 1, the HMDs 1A, 1B, and 1C are head-mounted display apparatuses to be worn by a user on the head and are of an optically transmissive type that allows the user, while viewing a virtual image, to also view an external scene in a direct manner. In the following description, a virtual image viewed by the user via the HMDs 1A, 1B, and 1C, is referred to as "display image" for convenience. Further, emitting an imaging light based on image data is referred to as "displaying an image". Here, the image is not limited to a still image, but also includes a moving image (video).

In a typical usage type of the display system 100, a plurality of users U wear the HMD 1. In FIG. 1, an example is illustrated in which three users U1, U2, and U3 wear the three HMDs 1A, 1B, and 1C, however, similarly to the number of HMDs 1, the number of users U is not limited. Further, of course, the plurality of users U can use one HMD 1 alternately. Below, unless otherwise provided with a distinction, the users U1, U2, and U3 are referred to as the user U.

In the exemplary embodiment, as a usage example of the display system 100, the HMD 1A worn by the user U1 captures an image of a visual field of the user U1 and transmits the captured image over the communication network 2. The captured image transmitted by the HMD 1A is temporarily stored in the server 200 and delivered from the server 200 to the HMDs 1B and 1C. The HMDs 1B and 1C receive and display the captured image data delivered by the server 200. Thus, the display system 100 serves as a sharing system in which an image captured by the HMD 1A is shared with the users U2 and U3, as well as with the user U1.

In the display system 100, the HMDs 1A, 1B, and 1C execute radio communication with each other and can transmit and/or receive various types of data including image data, sound data, control data, and the like. In the exemplary embodiment, an example is described in which captured image data of the HMD 1A is transmitted and/or received.

The server 200 is configured as a so-called cloud server and a hardware configuration may be of any type. That is, a configuration of the server 200 is not limited to an example in which the server 200 includes a single server device and the configuration may be such that functions of the server 200 are distributed among a plurality of server devices to be executed.

The server 200 corresponds to an external device with respect to the HMD 1. The server 200 includes a server storage unit 210 and a server communication unit 220 (transmitting unit). The server storage unit 210 is configured to store various types of data to be transmitted and received to and from the HMD 1A, 1B, 1C, or the like. For example, the server 200 stores later-described non-display information and map data in the server storage unit 210 and when receiving a request from the HMD 1A, transmits the requested non-display information, and map data to the HMD 1A. The server communication unit 220 is configured to perform data communication with the HMDs 1A, 1B, 1C, or the like over the communication network 2 and is constituted, for example, of a network interface substrate or the like.

The communication network 2 is achieved by various types of communication lines such as a radio communication line including a public network, a dedicated line, and a mobile phone line, and a backbone communication line of these lines or by a combination of the various types of communication lines, and a specific configuration is not limited. The communication network 2 may be a wide-range communication network capable of coupling remote locations and may be a local area network (LAN) installed in a specific facility or building. Further, the communication network may include network devices such as a gateway device, a router device, and a server device configured to couple the above-mentioned various types of communication lines. Moreover, the communication network may be constituted of a plurality of communication lines.

Radio access points 2A, 2B, and 2C are coupled to the communication network 2. The radio access points 2A, 2B, and 2C perform radio communication conforming to the standard of wireless LAN or the like and couple each of the HMDs 1A, 1B, and 1C to the communication network 2.

As long as a location of the user U1 and locations of the users U2 and U3 can be coupled to the communication network, there is no geographical limitation, and the location may be remote or nearby. Thus, the HMDs 1A, 1B, and 1C may be in proximity or far away from each other during use.

As described later, the HMD 1 displays an image via an image display unit 20 (display unit) so that the user U can view a scenery (external scene) of a real space, and thus, the user U can view an external scene and an image displayed by the image display unit 20, in an overlapping manner. The image display unit 20 may have any configuration, however, in the exemplary embodiment, transmissive type of image display unit 20 is illustrated which transmits light (outside light) entering from the outside.

The HMD 1A includes an image display unit 20A (display unit) to be worn by the user U1 on the head and a controller 10A configured to control the image display unit 20. The image display unit 20A allows the user 1 wearing on the head to view a virtual image. The controller 10A also serves as a control device for the user U1 to operate the HMD 1A.

The HMDs 1B and 1C include image display units 20B and 20C configured similarly to the image display unit 20A and controllers 10B and 10C configured similarly to the controller 10A. In the following, unless otherwise provided with a distinction, the image display units 20A, 20B, and 20C are referred to as the image display unit 20 and, unless otherwise provided with a distinction, the controllers 10A, 10B, and 10C are referred to as a controller 10.

1-2. Configuration of HMD

Here, the HMD 1A is given as an example to explain a configuration of the HMD 1. Illustration in the figures and description of the HMDs 1B and 1C are omitted.

Figure 2:
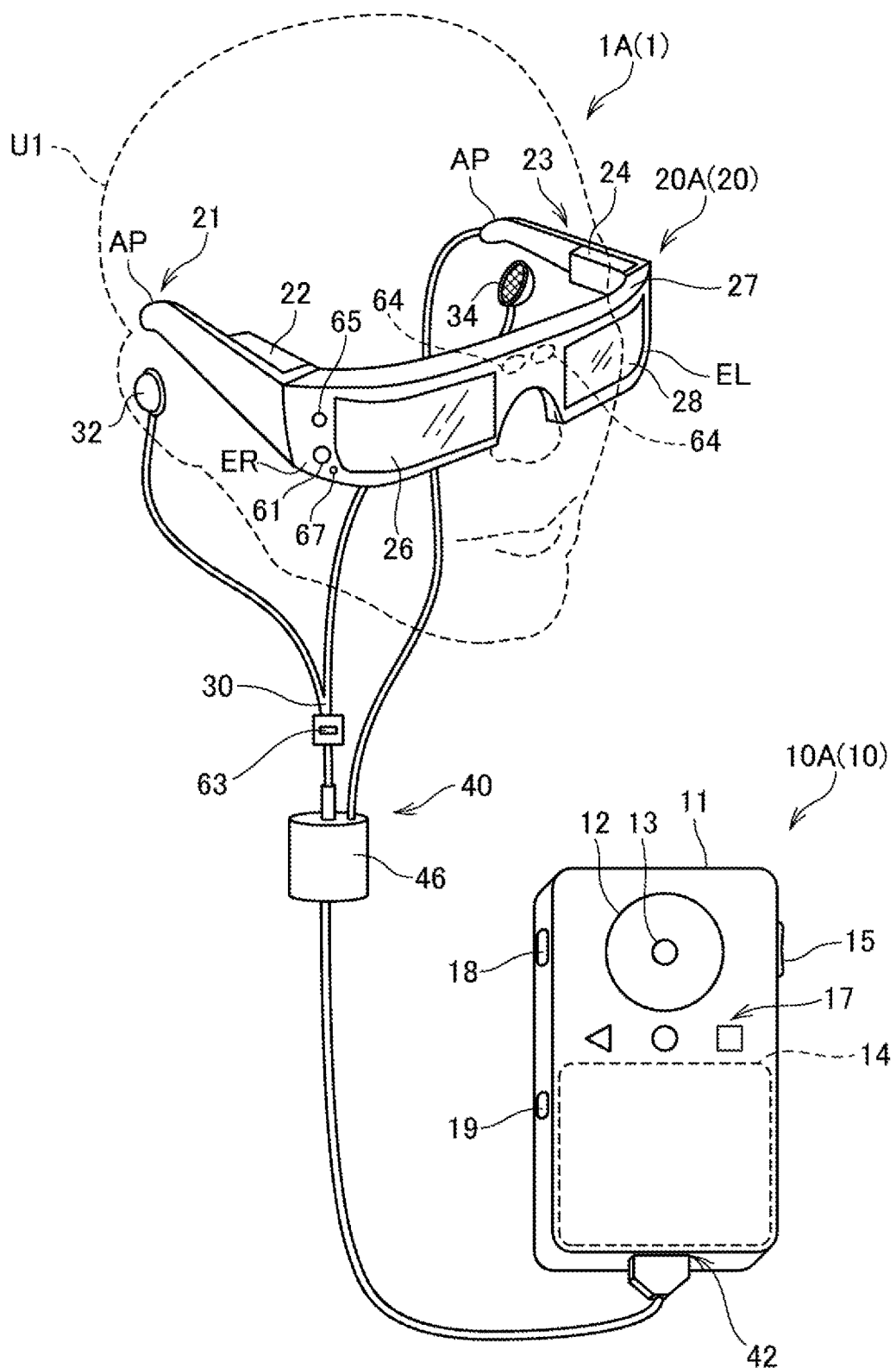
FIG. 2 is an explanatory diagram illustrating an appearance configuration of an HMD.

FIG. 2 is a diagram illustrating an appearance configuration of the HMD 1A.

The controller 10A includes, in a box-shaped main body 11, various types of switches and an operation pad 14 for receiving an operation of the user U1. In the exemplary embodiment, the image display unit 20A has an eyeglass shape, and includes, in a main body including a right holding part 21, a left holding part 23, and a front frame 27, a right display unit 22, a left display unit 24, a right light-guiding plate 26, and a left light-guiding plate 28.

The right holding part 21 and the left holding part 23 extend rearward from ends of the front frame 27 to hold the image display unit 20A on the head of the user U1. One of the ends of the front frame 27 that lies on the right side of the user U1 when s/he wears the image display unit 20 is referred to as an end ER, while the other end that lies on the left side of the user U1 is referred to as an end EL.

The right light-guiding plate 26 and the left light-guiding plate 28 are arranged in the front frame 27. With the user U1 wearing the image display unit 20A, the right light-guiding plate 26 is located in front of the right eye of the user U1 and the left light-guiding plate 28 is located in front of the left eye of the user U1.

The right display unit 22 and the left display unit 24 are a module in which an optical unit and a peripheral circuit are unitized, and are configured to emit an imaging light. The right display unit 22 is attached to the right holding part 21 and the left display unit 24 is attached to the left holding part 23.

The right light-guiding plate 26 and the left light-guiding plate 28 are optical components made of a light transmissive resin or the like. The right light-guiding plate 26 and the left light-guiding plate 28 are prisms, for example. The right light-guiding plate 26 is configured to guide an imaging light output by the right display unit 22 to the right eye of the user U1, and the left light-guiding plate 28 is configured to guide an imaging light output by the left display unit 24 to the left eye of the user. Thus, the imaging light enters both eyes of the user U1 and the user U1 can view an image.

The HMD 1A is a see-through type display device and the imaging light guided by the right light-guiding plate 26 and an outside light passing through the right light-guiding plate 26 enter a right eye RE of the user U. Similarly, the imaging light guided by the left light-guiding plate 28 and an outside light passing through the left light-guiding plate 28 enter a left eye LE. As described above, the HMD 1A allows the imaging light L corresponding to the image processed internally and the outside light to enter the eyes of the user U in an overlapped manner, and the user U can see the external scene through the right light-guiding plate 26 and the left light-guiding plate 28, and can view the image based on the imaging light overlapping with the external scene.

An electronic shade (not illustrated) having a light-control function may be arranged on the surface of the right light-guiding plate 26 and the left light-guiding plate 28. The electronic shade is a plate-shaped electronic device configured to change a transmittance (light transmittance) of a light in accordance with a control of a later-described control unit 150 (FIG. 5) and includes a liquid crystal panel, for example. When the electronic shade is arranged on the image display unit 20A, an outside light passing through the electronic shade enters the right eye RE and the left eye LE of the user wearing the image display unit 20A, and thus, a light amount of outside light entering the eye of the user can be controlled in accordance with the transmittance of the electronic shade.

An illumination sensor 65 is placed in the front frame 27 of the image display unit 20A. The illumination sensor 65 receives outside light from the front of the user U1 wearing the image display unit 20A.

A camera 61 (imaging unit) is arranged on the front frame 27 of the image display unit 20A. An imaging range and an imaging direction of the camera 61 will be described later. The camera 61 is provided at a position so that the camera 61 does not block the outside light passing through the right light-guiding plate 26 and the left light-guiding plate 28. As illustrated in FIG. 2, the camera 61 is arranged at the side of the end ER of the front frame 27, however, the camera 61 may be also arranged at the side of the end EL, or at a connection of the right light-guiding plate 26 and the left light-guiding plate 28.

The camera 61 is a digital camera equipped with an imaging lens and an imaging element such as a charge-coupled device (CCD) or a complementary metal oxide semiconductor (CMOS), and while the camera 61 according to the exemplary embodiment is a monocular camera, the camera 61 may be configured of a stereo camera. The camera 61 is configured to capture an image in accordance with a control by the control unit 150, and output captured image data to the control unit 150.

An LED indicator 67 is arranged in the front frame 27. The LED indicator 67 is arranged adjacent to the camera 61 at the end ER and is configured to turn on while the camera 61 is operating to notify that the capturing is in progress.

A distance sensor 64 is configured to detect a distance to an object to be measured located along a pre-set measurement direction. In the exemplary embodiment, the distance sensor 64 is arranged on the front frame 27 and detects a distance to an object to be measured located in front of the user U1. The distance sensor 64 may be, for example, a light-reflective distance sensor including a light source, such as an LED or a laser diode, and a light-receiving part configured to receive reflected light emitted by the light source and reflected by the object to be measured. Further, the distance sensor 64 may be an ultrasound-type distance sensor including a sound source configured to emit an ultrasonic wave and a detection unit configured to receive the ultrasonic wave reflected by the object to be measured. Further, for the distance sensor 64, a laser range scanner (scanning range sensor) may be employed and in this case, a wide-range area including the front of the image display unit 20A can be measured.

The controller 10A and the image display unit 20A are coupled via a coupling cable 40. The coupling cable 40 is detachably coupled to a connector 42 of the main body 11.

The coupling cable 40 includes an audio connector 46, and, a headset 30 including a right ear piece 32 and a left ear piece 34 included in a stereo headphone, and a microphone 63, is coupled to the audio connector 46.

Figure 4:
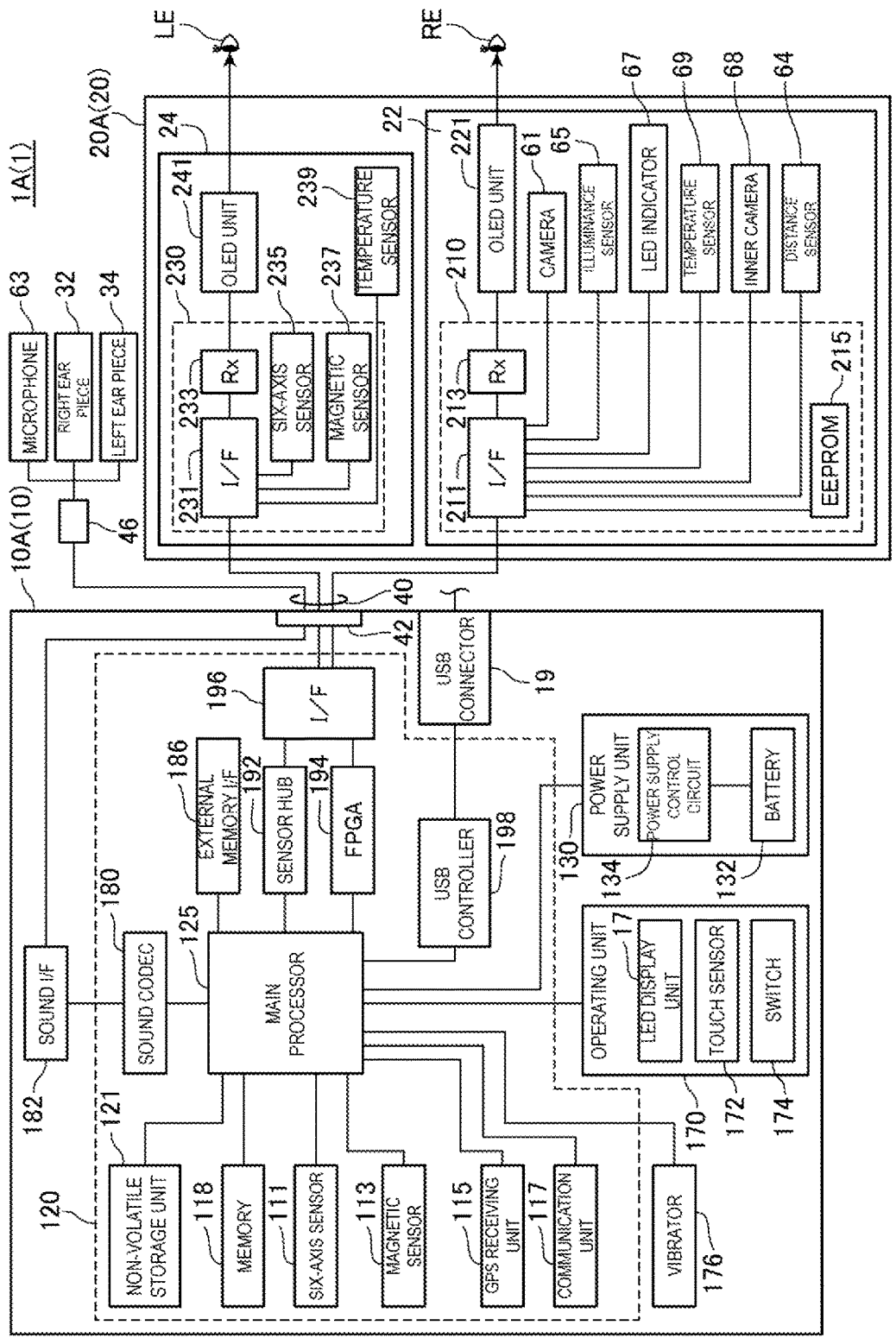
FIG. 4 is a block diagram of the HMD.

The microphone 63 is configured to collect sound and output a sound signal to a sound interface 182 (FIG. 4). The microphone 63 may be, for example, a monaural microphone or a stereo microphone, or may be a directional microphone or a non-directional microphone.

The controller 10A includes, as components to be operated by the user U1, a wheel operation unit 12, a central key 13, an operation pad 14, an up-down key 15, an LED display unit 17, and a power switch 18. The components to be operated are arranged on a surface of the main body 11. The components to be operated described above can be operated by a hand finger of the user U1, for example.

The Light Emitting Diode (LED) display unit 17 is arranged in the main body 11. The LED display unit 17 includes a transmission part (not illustrated) capable of transmitting light and when an LED placed directly under the transmission part lights up, a character, symbol, pattern, or the like, formed on the transmitting unit can be viewed. A touch operation on the LED display unit 17 by the hand finger of the user U1 is detected by a touch sensor 172 (FIG. 4). Thus, the combination of the LED display unit 17 and the touch sensor 172 serves as a software key.

The power switch 18 is a switch configured to select power on/off for the HMD 1A. Further, the main body 11 includes, as an interface for coupling the controller 10A to an external device, a Universal Serial Bus (USB) connector 19.

Figure 3:
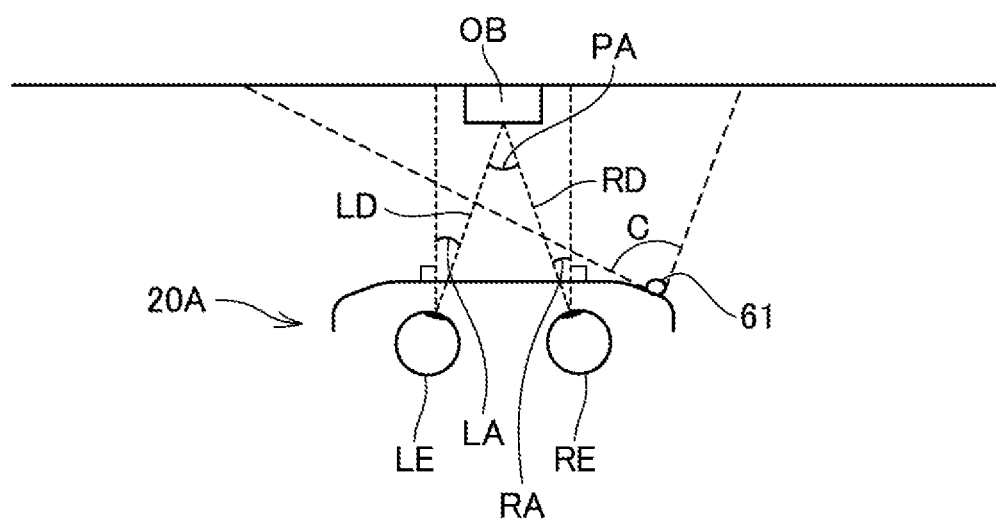
FIG. 3 is a schematic diagram illustrating a correspondence of an imaging range with an image display unit.

FIG. 3 is a diagram illustrating a configuration of a main part of the image display unit 20A and schematically illustrates a position of the camera 61 in plan view, together with the right eye RE and the left eye LE of the user U1.

In FIG. 3, an angle of view (imaging range) of the camera 61 is indicated by C. The camera 61 captures an image in the sight line direction of both eyes of the user U1, that is, in front of the user U1. Note that the actual angle of view of the camera 61 also extends in the up-down direction as with any common digital camera.

The camera 61 captures at least a part of an external scene (real space) in a direction of the field of view of the user U1 wearing the HMD 1A, and the angle of view C of the camera 61 is directed in a front direction of the user U1 and overlaps with the external scene viewed by the user U1 through the image display unit 20A. The angle of view C more preferably includes the entire field of view viewed by the user U1 through the image display unit 20.

The camera 61 may be configured to focus infinitely, however, the focus of the camera 61 may be adjustable in accordance with a control of the control unit 150.

As illustrated in FIG. 3, when the user U1 fixates on an object OB with both eyes, the line-of-sight of the user U1 is directed to the object OB as illustrated by RD and LD in the figure. In this case, the distance from the user U1 to the object OB often ranges from approximately 30 cm to 10 m, both inclusive, and more often ranges from 1 m to 4 m, both inclusive. Based upon this, standard maximum and minimum distances from the user U1 to the object OB that the user U1 can take during normal use of the HMD 1A may be specified. The standard values may be determined through investigations or experiments, or may be set by the user U1. It is preferred that the optical axis and the angle of view C of the camera 61 be set such that the object OB is included within the angle of view when the distance to the object OB during normal use corresponds to the set standards of the maximum and minimum distances.

Generally, the visual field angle of humans is around 200 degrees in the horizontal direction, and around 125 degrees in the vertical direction, and within these angles, an effective visual field advantageous for information acceptance performance is 30 degrees in the horizontal direction and 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. In this case, when the point of fixation lies at the object OB in FIG. 3, the effective field of view is approximately 30 degrees in the horizontal direction and approximately 20 degrees in the vertical direction around the line-of-sights RD and LD. Further, the stable visual field of fixation ranges from approximately 60 degrees to 90 degrees, both inclusive, in the horizontal direction and from approximately 45 degrees to 70 degrees, both inclusive, in the vertical direction, and the visual field angle is approximately 200 degrees in the horizontal direction, and approximately 125 degrees in the vertical direction. The visual field of the user U1 actually viewing an object through the image display unit 20A and through the right light-guiding plate 26 and the left light-guiding plate 28 can be referred to as an actual field of view (FOV). In the configuration of the exemplary embodiment illustrated in FIG. 2, the actual field of view corresponds to the actual field of view for the user U1 to view an object through the right light-guiding plate 26 and the left light-guiding plate 28. The actual field of view is narrower than the visual field angle and the stable field of fixation, but wider than the effective field of view.

Here, preferably, the angle of view C of the camera 61 is wider than the effective field of view of the user U1. More preferably, the angle of view C is wider than the actual field of view of the user U1 and even more preferably the angle of view C is wider than the stable field of fixation of the user U1. Most preferably, the angle of view C is wider than the visual field angle of both eyes of the user U1.

The camera 61 may be equipped with a so-called wide-angle lens as an imaging lens, and may be configured to capture a wider angle of view. The wide-angle lens may include lenses called a super wide-angle lens or a semi wide-angle lens, or the wide-angle lens may be a single-focus lens or a zoom lens, or the camera 61 may be configured to have a lens group including a plurality of lenses.

Further, as described above, the camera 61 may be arranged at the side of the end EL or at the connection between the right light-guiding plate 26 and the left light-guiding plate 28. In this case, a position of the camera 61 in the left-right direction is different from the position in FIG. 4 and the optical axis and the angle of view C of the camera 61 are appropriately configured in accordance with an arrangement position of the camera 61.

Note that, in the following description, the imaging range of the camera 61 corresponding to the angle of view C is simply referred to as an imaging range.

In FIG. 3, a convergence angle of the user U1 is indicated by PA. The convergence angle PA corresponds to a distance to the object OB the user U1 fixates on. That is, when the user U1 sterically views an image and an object, the convergence angle of the right eye RE and the left eye LE is determined in accordance with the distance to the object to be viewed. Accordingly, the convergence angle can be detected to evaluate a distance from where the user U1 fixates on. Further, when an image is displayed so to guide the convergence angle of the user U1, a stereoscopic view can be induced.

The user U1 adjusts a sight line direction RA of the right eye RE in accordance with a display position in a left-right direction of the image of the right display unit 22 and adjusts a sight line direction LA of the left eye LE in accordance with a display position in a left-right direction of the image of the left display unit 24. Thus, as a result of controlling the display position of the image of the right display unit 22 and the left display unit 24, the sight lines of the right eye RE and the left eye LE of the user U1 can be guided and the convergence angle PA can be controlled when the user U1 views the display image of the image display unit 20A.

Thus, a function of the HMD 1A can adjust a distance for the user U1 to recognize and perceive the display image of the image display unit 20A.

A specific example of an imaging direction in which the camera 61 captures an image (a predetermined direction in the invention) may include a direction including the sight line direction of the user U1, but may include the front of the user U1 wearing the image display unit 20. Further, the imaging direction of the camera 61 may be a movement direction of the user U1 wearing the image display unit 20. Moreover, the imaging direction may be also a direction in which the user U1 sees a later-described non-display object. As mentioned above, the angle of view of the camera 61 is not limited and may be a wide angle. For example, the camera may be capable of capturing an image in 360°, such as an omnidirectional camera, and may be a composite device including a plurality of imaging elements, a plurality of lenses, and the like to capture a wide angle of view.

1-3. Control System of HMD

FIG. 4 is a block diagram illustrating a configuration of components included in the HMD 1A.

The controller 10A includes a main processor 125 configured to execute a program to control the HMD 1A. The main processor 125 is coupled with a memory 118 and a non-volatile storage unit 121. The main processor 125 is coupled with an operation unit 170 as an input device.

The main processor 125 is coupled with sensors including a six-axis sensor 111, a magnetic sensor 113, and a GPS 115.

The main processor 125 is coupled with a communication unit 117, a sound codec 180, an external memory interface 186, a USB connector 19, a sensor hub 192, and an FPGA 194. The components function as an interface to external devices.

The main processor 125 is mounted on a controller substrate 120 built into the controller 10A. In the exemplary embodiment, the six-axis sensor 111, the magnetic sensor 113, the GPS 115, the communication unit 117, the memory 118, the non-volatile storage unit 121, the sound codec 180, and the like are mounted on the controller substrate 120. Further, the external memory interface 186, the USB connector 19, the sensor hub 192, the FPGA 194, and an interface 196 may be mounted on the controller substrate 120. Moreover, the connector 42 and the USB connector 19 may be mounted on the controller substrate 120.

The memory 118 configures a work area used to temporarily store a program to be executed by the main processor 125, data to be processed by the main processor 125, and the like. The non-volatile storage unit 121 includes a flash memory and an embedded multi-media card (eMMC). The non-volatile storage unit 121 is configured to store programs to be executed by the main processor 125 and data to be processed by the main processor 125.

The operation unit 170 includes the LED display unit 17, the touch sensor 172, and a switch 174. The touch sensor 172 detects a touch operation by the user U1, specifies an operation position, and outputs an operation signal to the main processor 125. The switch 174 outputs an operation signal to the main processor 125, in accordance with an operation on the up-down key 15 and the power switch 18. The LED display unit 17 turns on, blinks, or turns off the LED in accordance with the control by the main processor 125. The operation unit 170 is, for example, a switch substrate on which the LED display unit 17, the touch sensor 172, the switch 174, and a circuit for controlling these are mounted, and is accommodated in the main body 11.

The six-axis sensor 111 is an example of a motion sensor (inertial sensor) configured to detect a movement of the controller 10A. The six-axis sensor 111 includes a three-axis acceleration sensor and a three-axis gyro (angular velocity) sensor. The six-axis sensor 111 may include an inertial measurement unit (IMU) in which the sensors are provided as modules.

The magnetic sensor 113 is a three-axis geomagnetic sensor, for example.

The Global Positioning System (GPS) 115 includes a GPS antenna (not illustrated) and is a receiver configured to receive a radio signal transmitted from a GPS satellite. The GPS 115 detects or calculates coordinates of a current position of the controller 10A, based on a GPS signal.

The six-axis sensor 111, the magnetic sensor 113, and the GPS 115 output an output value to the main processor 125 in accordance with a predetermined sampling period. Further, the six-axis sensor 111, the magnetic sensor 113, and the GPS 115 may be configured to output, in response to a request from the main processor 125, detected values to the main processor 125 at a timing specified by the main processor 125.

The communication unit 117 is a communication device configured to execute radio communication with an external device. The communication unit 117 includes an antenna (not illustrated), an RF circuit, a baseband circuit, a communication control circuit, and the like, and may be a device in which the above-described components are integrated. Further, the communication unit 117 may be a communication module substrate on which various types of circuits are mounted. The communication unit 117 is configured to perform wireless communications conforming to the standard of Bluetooth (trade name), wireless LAN (including Wi-Fi (trade name)), or the like. The communication unit 117 performs wireless data communication with the wireless access point 2A (FIG. 1).

The sound interface 182 configured to input and output a sound signal is coupled to the audio connector 46 (FIG. 2) to input and output a sound signal and encode/decode the sound signal. The sound codec 180 may include an analog/digital (A/D) converter configured to convert an analog sound signal into digital sound data and a digital/analog (D/A) converter configured to perform the opposite conversion.

The external memory interface 186 is an interface capable of coupling portable memory devices, and includes, for example, an interface circuit and a memory card slot capable of accepting a card-type recording medium for reading data.

A vibrator 176 is mounted on the controller 10A. The vibrator 176 includes a motor (not illustrated), an eccentric rotor (not illustrated), and the like, and is controlled by the main processor 125 to create a vibration. For example, when the operation unit 170 is operated or a power supply to the HMD 1A is turned on or off, the vibrator 176 vibrates in a predetermined vibration pattern.

The interface (I/F) 196 couples the sensor hub 192 and the Field Programmable Gate Array (FPGA) 194 to the image display unit 20A.

The sensor hub 192 is configured to acquire detected values of the sensors included in the image display unit 20A and output the detected values to the main processor 125. The FPGA 194 is configured to process data to be transmitted and received between the main processor 125 and components of the image display unit 20, as well as to execute transmissions via the interface 196.

The right display unit 22 and the left display unit 24 are individually coupled to the controller 10A via the coupling cable 40 and a line in the image display unit 20A (not illustrated).

The right display unit 22 includes an organic light emitting diode (OLED) unit 221 configured to emit imaging light. The imaging light emitted by the OLED unit 221 is guided to the right light-guiding plate 26 by an optical system including a lens group and the like. The left display unit 24 includes an OLED unit 241 configured to emit imaging light. The imaging light emitted by the OLED unit 241 is guided to the left light-guiding plate 28 by an optical system including a lens group and the like.

The OLED units 221, 241 include an OLED panel and a drive circuit configured to drive the OLED panel. The OLED panel is a light emission type display panel including light-emitting elements arranged in a matrix and configured to emit red (R) color light, green (G) color light, and blue (B) color light, respectively, by organic electro-luminescence. The OLED panel includes a plurality of pixels, each including an R element, a G element, and a B element, arranged in a matrix to form an image. The drive circuit is controlled by the control unit 150 to select and power the light-emitting elements of the OLED panel to cause the light-emitting elements of the OLED panel to emit light. Thus, imaging light of an image formed by the OLED units 221, 241 is guided to the right light-guiding plate 26 and the left light-guiding plate 28 to enter the right eye RE and the left eye LE.

The right display unit 22 includes a display unit substrate 210. The display unit substrate 210 is mounted with an interface (I/F) 211 to be coupled to the interface 196, a receiving unit (Rx) 213 configured to receive data input from the controller 10A via the interface 211, and an EEPROM 215. The interface 211 couples the receiving unit 213, the EEPROM 215, a temperature sensor 69, the camera 61, the illumination sensor 65, and the LED indicator 67, to the controller 10A.

The electrically erasable programmable read-only memory (EEPROM) 215 stores data so as to be readable by the main processor 125. The EEPROM 215 stores data about a light-emitting property and a display property of the OLED units 221 and 241 of the image display unit 20A, and data about a sensor property of the right display unit 22 or the left display unit 24, for example. Specifically, the EEPROM 215 stores parameters regarding Gamma correction performed by the OLED units 221 and 241, and data used to compensate for the detected values of the temperature sensors 69 and 239 described later, for example. These data are created by an inspection when the HMD 1A is inspected upon shipping from a factory, and written into the EEPROM 215. After the shipment, the main processor 125 can utilize the data of the EEPROM 215 to perform the processing.

The camera 61 captures an image in accordance with a signal entered via the interface 211 and outputs captured image data or a signal indicative of the result of imaging to the interface 211.

The illumination sensor 65 is configured to output a detected value corresponding to the amount of received light (intensity of received light) to the interface 211. The LED indicator 67 turns on and off in accordance with a signal input via the interface 211.

The temperature sensor 69 is configured to detect a temperature and output, to the interface 211, a voltage value or a resistance value corresponding to the detected temperature as a detected value. The temperature sensor 69 is mounted on a rear face of the OLED panel included in the OLED unit 221, or on the same substrate as the drive circuit driving the OLED panel and detects a temperature of the OLED panel. When the OLED panel is mounted as an Si-OLED together with the drive circuit and the like to form an integrated circuit on an integrated semiconductor chip, the temperature sensor 69 may be mounted on the semiconductor chip.

The receiving unit 213 is configured to receive data transmitted by the main processor 125 via the interface 211. Upon receiving image data from the interface 211, the receiving unit 213 outputs the received image data to the OLED unit 221.

The left display unit 24 includes a display unit substrate 230. The display unit substrate 230 is mounted with an interface (I/F) 231 coupled to the interface 196, and a receiving unit (Rx) 233 configured to receive data input from the controller 10A via the interface 231. Further, the display unit substrate 230 is mounted with a six-axis sensor 235 and a magnetic sensor 237. The interface 231 couples the receiving unit 233, the six-axis sensor 235, the magnetic sensor 237, and the temperature sensor 239 to the controller 10A.

The six-axis sensor 235 is an example of a motion sensor configured to detect a movement of the image display unit 20A. The six-axis sensor 235 includes a three-axis acceleration sensor and a three-axis gyro sensor. The six-axis sensor 235 may be an IMU in which the above-described sensors are modularized.

The magnetic sensor 237 is a three-axis geomagnetic sensor, for example.

The temperature sensor 239 is configured to detect a temperature and output, as the detected value, a voltage value or a resistance value corresponding to the detected temperature, to the interface 231. The temperature sensor 239 is mounted on a rear face of the OLED panel included in the OLED unit 241, or on the same substrate as the drive circuit driving the OLED panel and detects the temperature of the OLED panel. Further, when the OLED panel is an Si-OLED and is implemented, together with the drive circuit and the like, as an integrated circuit on an integrated semiconductor chip, the temperature sensor 239 may be mounted on the semiconductor chip.

The camera 61, the illumination sensor 65, the temperature sensor 69, the six-axis sensor 235, the magnetic sensor 237, and the temperature sensor 239 are coupled to the sensor hub 192 of the controller 10A.

The sensor hub 192 sets and initializes a sampling period of each sensor in accordance with the control of the main processor 125. Based on the sampling periods of the sensors, the sensor hub 192 supplies power to the sensors, transmits control data, and acquires detected values, for example. At a pre-set timing, the sensor hub 192 outputs a detected value of each sensor to the main processor 125. The sensor hub 192 may include a function for temporarily holding the detected value of each sensor in accordance with an output timing to the main processor 125. Further, the sensor hub 192 may have a function of corresponding a difference in a signal format or data format of the output value from each sensor to convert the output value to data in a unified data format and output the data to the main processor 125.

The sensor hub 192 is also controlled by the main processor 125 to start and stop supplying power to the LED indicator 67 to turn on or off the LED indicator 67 in accordance with the timing when the camera 61 starts and ends capturing images.

The controller 10A includes a power supply unit 130, and operates by the power supplied from the power supply unit 130. The power supply unit 130 includes a rechargeable battery 132, and a power supply control circuit 134 configured to detect a remaining amount of the battery 132, and control the charging of the battery 132.

A USB controller 198 serves as a USB device controller and establishes communication with a USB host device coupled to the USB connector 19 to perform data communication. Further, the USB controller 198 may have, in addition to the function as the USB device controller, a function as a USB host controller.

Figure 5:
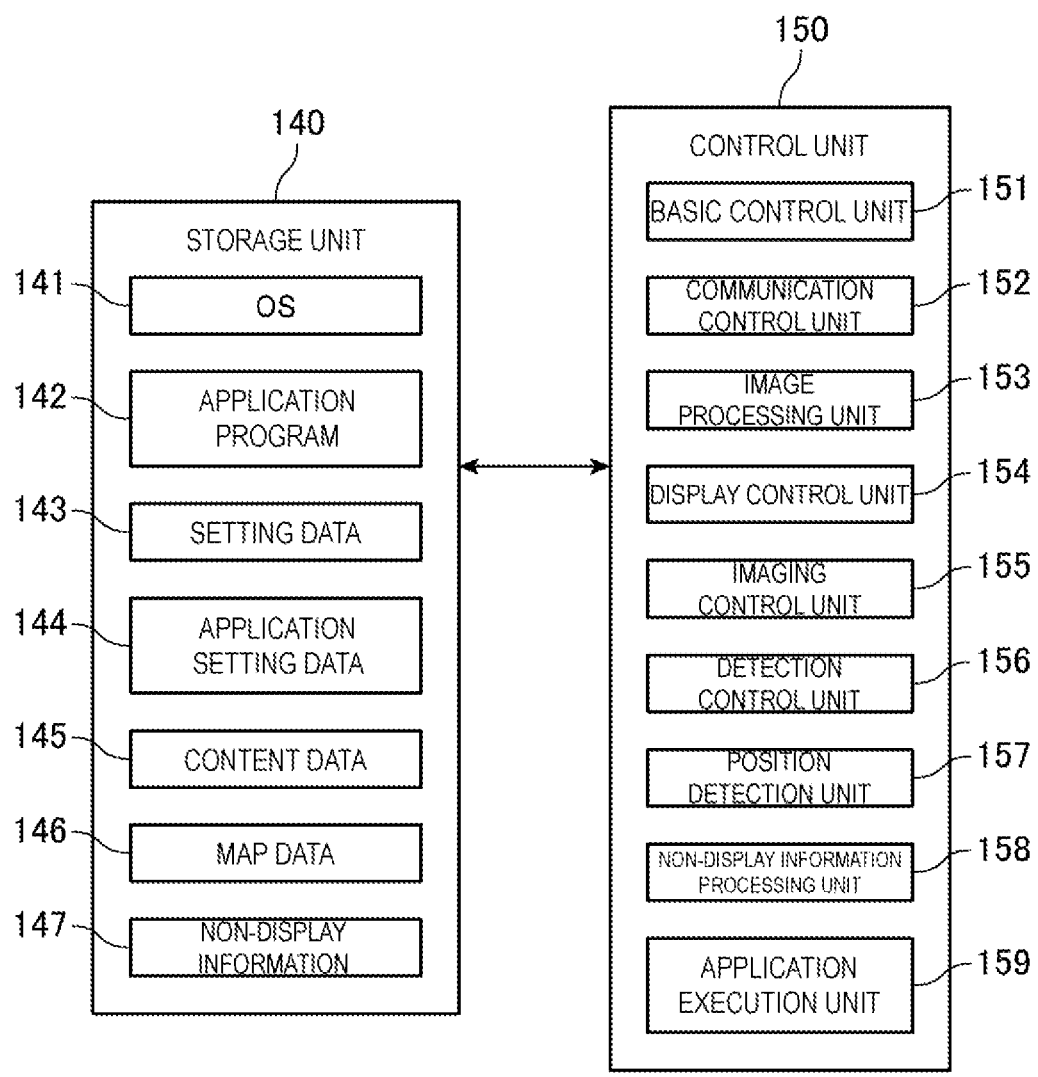
FIG. 5 is a functional block diagram of a control unit and a storage unit of the HMD.

FIG. 5 is a functional block diagram of a storage unit 140 and the control unit 150 included in the control system of the controller 10A of the HMD 1A. The storage unit 140 illustrated in FIG. 5 is a logical storage unit configured based on the non-volatile storage unit 121 (FIG. 4), and may include the EEPROM 215. The control unit 150 and the various types of functional components included in the control unit 150 are formed when the main processor 125 executes a program to collaboratively operate the software and the hardware. The controller 150 and the functional components included in the controller 150 include for example, the main processor 125, the memory 118, and the non-volatile storage unit 121.

The storage unit 140 stores various types of programs to be executed by the main processor 125 and data to be processed by these programs. The storage unit 140 stores an operating system (OS) 141, an application program 142, setting data 143, application setting data 144, content data 145, map data 146, and non-display information 147.

By executing the program stored in the storage unit 140, the control unit 150 processes the data stored in the storage unit 140 to control the HMD 1A.

The operating system 141 is a basic control program of the HMD 1A to be executed by the main processor 125. When the power supply to the HMD 1A is switched on by an operation on the power switch 18, the main processor 125 loads and executes the operating system 141. When the main processor 125 executes the operating system 141, various types of functions of the control unit 150 are achieved. The functions of the control unit 150 include a basic control unit 151, a communication control unit 152, an image processing unit 153, a display control unit 154, an imaging control unit 155, a detection control unit 156, a position detection unit 157, and a non-display information processing unit 158. Further, the functions achieved by the operating system 141 include an application execution unit 159.

The application program 142 is a program to be executed by the main processor 125 while the main processor 125 executes the operating system 141. The application program 142 utilizes various types of functions of the control unit 150. The application program 142 stored in the storage unit 140 is not limited to one program and may be plural. For example, the application program 142 achieves functions such as image content reproduction, sound content reproduction, games, camera filming, document creating, web browsing, schedule management, telephony (including voice communication), image communication, and route navigation.

The setting data 143 includes various types of set values for operations of the HMD 1A. Further, in a case where the control unit 150 uses parameters, determinants, computing equations, LookUp Tables (LUTs), and the like when controlling the HMD 1A, the parameters, the determinants, the computing equations, the LookUp Tables (LUTs), and the like may be included in the setting data 143.

The application setting data 144 is data used when the application program 142 is executed in the HMD 1A. Specifically, the application setting data 144 includes data such as an execution condition for executing the various types of programs included in the application program 142. For example, the application setting data 144 includes data indicating an image display size and a screen orientation during the execution of the application program 142, functional components of the control unit 150 or sensors of the HMD 1A used by the application program 142, and the like.

When installing the application program 142, an installation process is executed in the HMD 1A by a function of the control unit 150. The installation process is a process that includes not only storing of the application program 142 in the storage unit 140, but also includes setting of an execution condition of the application program 142 and the like. When the application setting data 144 corresponding to the application program 142 is created or stored in the storage unit 140 by the installation process, the application execution unit 159 can start the application program 142.

The content data 145 is the data of contents including images and movies to be displayed on the image display unit 20A through control by the control unit 150. The content data 145 includes still image data, video (moving image) data, sound data, and the like. The content data 145 may include data of a plurality of contents. The content data 145 may be data of bidirectional content. For example, when the image display unit 20A displays contents, a display format or the contents and the contents themselves are switched, in accordance with an operation by the user U to the controller 10A. In this case, the content data 145 may include, together with the data of the contents, image data of a menu screen to be displayed when an operation is received, data determining a process and the like corresponding to an item included in the menu screen, and the like.

The map data 146 is data including positional information of a range in which the HMD 1A is used. The map data 146 includes data for associating a position of an object such as a later-described non-display object, to positional information. The map data 146 may be two-dimensional (2D) data and may be three-dimensional (3D) data. Information indicating a position of the non-display object may be information in accordance with the map data 146, may be 2D positional information, and may be 3D positional information. Further, the map data 146 may be data of a closed area in which the specified HMD 1A can be used. In this case, the positional information included in the map data 146 may be information indicating a position in the closed region and may be information not for general purpose. Further, the map data 146 may be general-purpose map data 146 in which latitude, longitude, and elevation above sea level (altitude) are used as positional information.

The control unit 150 may utilize the map data 146 to execute Simultaneous Localization and Mapping (SLAM). In this case, the map data 146 may be a template or a platform for recording positional information of a region in which the HMD 1A is used.

When SLAM is executed, the control unit 150 performs, upon a movement of the user U1 wearing the image display unit 20, a process of creating a map in a movement range of the image display unit 20. SLAM is a technology in which an object is detected from captured image data of the camera 61 and position detection is performed based on a shape of the detected object. In the process of creating the map, the control unit 150 executes imaging multiple times by the camera 61 during the movement of the image display unit 20, and when a same shape is detected from the captured image data, performs association to set a position of the same shape as the same position. By continuously executing this process, the control unit 150 creates a closed map of a vicinity of the image display unit 20. The control unit 150 can associate the created map, for example, with coordinates of a position detected based on the detected values of the magnetic sensor 113, the GPS 115, the communication unit 117, the six-axis sensor 235, the magnetic sensor 237, and the like, or with coordinates of the movement range of the HMD 1 to create the map data 146. Further, the map data 146 may not be associated to coordinates. A spatial map can be created by a known SLAM technology and thus, the map data 146 can be a three-dimensional map. Further, the control unit 150 may create the map data 146 by a known Monte Carlo method.

The non-display information 147 includes, in the captured image data through the camera 61 by the HMD 1A, data indicating an object that should not be displayed (hereinafter, referred to as a non-display object). The non-display object designates a matter that should not be included in an image transmitted from the HMD 1A to the server 200. The non-display object is determined in view of privacy protection or secret information protection. Specifically, examples of non-display objects that can identify an individual include a face of a person, a body, clothing, a name card, a business card, a notice on which an individual name is listed, and the like. Further, examples of the non-display object to be protected as secret information include a machine and an equipment, a design drawing, information displayed on a computer display, and the like. In other words, the non-display object includes a printed material, a notice, a written object, a computer display, and the like including information to be concealed. The information to be concealed includes information about privacy of an individual, and private information, and specifically includes a face of a person, a body clothing, a name card, a business card, a notice on which an individual name is listed, and the like. Further, the information to be concealed may be secret information and includes a design drawing or a program code of a machine or an equipment, or other copyrighted work.

The non-display information 147 is information for determining whether the non-display object is included in the captured image data of the camera 61. For example, the non-display information 147 is data specifying a position of the non-display object in a movement range of the user U1, that is, a geographical range in which the HMD 1A is used. In this case, the non-display information 147 may be information including the map data 146 and information indicating the position of the non-display object on the map, or may be information associated with the map data 146. For example, the non-display information 147 may be information used in combination with specific map data 146.

When the non-display information 147 includes information regarding the position of the non-display object, it is possible to determine whether the non-display object is included in the imaging range of the camera 61, based on a relative position between the HMD 1A (specifically, the image display unit 20A) and the non-display object, and the non-display information 147. Further, the non-display information 147 is preferably information capable of specifying the position of the non-display object in the imaging range of the camera 61.

When the control unit 150 creates the map data 146 based on the SLAM technology mentioned above or the like, the non-display information 147 may be information indicating the position of the non-display object in the map data 146 created by the control unit 150.

Further, the control unit 150 may create information specifying the position of the non-display object in the map data 146. For example, when the storage unit 140 stores, as the non-display information 147, information for detecting an image of an appearance of the non-display object from the captured image data of the camera 61, the control unit 150 detects the appearance of the non-display object upon detecting a shape from the captured image data of the camera 61 in the process of creating the map data 146. Alternatively, the control unit 150 detects the image of the appearance of the non-display object from the map data 146 created from the captured image data of the camera 61. Thus, the control unit 150 can specify the non-display object in the map data 146 by an image detection technology based on the captured image data. The control unit 150 may set a non-display region based on the position of the non-display object.

Further, when the non-display object is seen from a specified position on the map data 146, the non-display information 147 may include information about an obstacle obstructing visual recognition of the non-display object. Examples of the obstacle include a house or a building, a wall, an equipment, a machine, and a natural object such as a mountain or a tree placed in the range of the map data 146, and the obstacle is not limited and may be any object obstructing visual recognition. In this case, it is possible to determine whether a non-display object included in the camera 61 can be viewed, based on the relative position between the HMD 1A and the non-display object and the non-display information 147.

Further, the non-display information 147 may not include information about the position of the non-display object. For example, the non-display information 147 may be information for detecting the non-display object from the captured image data of the camera 61 and may include an amount of characteristic of the image of the non-display object (the image of the appearance of the non-display object). In this case, captured image data of the camera 61 can be analyzed to detect the image of the non-display object from the captured image data by pattern matching, for example, and specify the position of the image of the non-display object in the captured image data. In this case, the non-display information 147 does not need to be associated with the map data 146, and thus, the storage unit 140 may not store the map data 146. Further, the non-display information 147 may include both information indicating the position of the non-display object to be combined with the map data 146 and an image characteristic amount of the image of the non-display object. Further, when the non-display object includes a text (character), the non-display information 147 may include information indicating the text. In this case, the non-display information 147 recognizes the character included in the captured image data of the camera 61 and when the recognized character or character string includes a character or character string identical or similar to the character included in the non-display information 147, the character or character string is detected as the non-display information.

The basic control unit 151 executes a basic function of controlling components of the HMD 1A. The basic control unit 151 executes an initialization process when the power supply to the HMD 1A is switched on, initializes components of the HMD 1A, and renders the application execution unit 159 capable of executing an application program. The basic control unit 151 executes a shut-down process when turning off the power supply to the controller 10A, terminates the application execution unit 159, updates various types of data stored in the storage unit 140, and stops the HMD 1A. In the shut-down process, the power supply to the image display unit 20A is also stopped and the entire HMD 1A is shut down.

The basic control unit 151 has a function of controlling the power supply by the power supply unit 130. By the shut-down process, the basic control unit 151 individually switches off the power supply from the power supply unit 130 to the components of the HMD 1A.

The communication control unit 152 executes data communication by the communication unit 117. The communication control unit 152 controls a communication function included in the communication unit 117 to execute data communication with a device of a specified communication destination. The basic control unit 151 and the application execution unit 159 transmit and receive data to and from other devices through a function of the communication control unit 152, and can, for example, utilize the received data.

The image processing unit 153 is configured to create a signal to be transmitted to the right display unit 22 and the left display unit 24 based on the image data of the image or the video to be displayed on the image display unit 20A. Signals created by the image processing unit 153 may be a vertical synchronizing signal, a horizontal synchronizing signal, a clock signal, an analog image signal, or the like. The image processing unit 153 may, as necessary, perform a resolution conversion process of converting the resolution of image data into a resolution appropriate for the right display unit 22 and the left display unit 24. Further, the image processing unit 153 may also execute an image adjustment process of adjusting a brightness and chroma of the image data, a 2D/3D conversion process of creating 2D image data from 3D image data, or creating 3D image data from 2D image data, and the like. When one of the image processes is executed, the image processing unit 153 creates a signal for displaying an image based on the processed image data and transmits the signal to the image display unit 20A.

The image processing unit 153 may be achieved when the main processor 125 executes the operating system 141 or may be a separate hardware from the main processor 125. An example of the hardware includes a digital signal processor (DSP).

The display control unit 154 is configured to create a control signal for controlling the right display unit 22 and the left display unit 24, and control the creation and emission of the imaging light by each of the right display unit 22 and the left display unit 24. For example, the display control unit 154 causes the OLED panel to execute display of an image and controls an image-drawing timing on the OLED panel and the brightness, and the like.

The imaging control unit 155 controls the camera 61 to execute capturing an image, creates captured image data, and temporarily stores the data into the storage unit 140. Further, in a case where the camera 61 is configured as a camera unit including a circuit configured to create captured image data, the imaging control unit 155 acquires the captured image data from the camera 61 to temporarily store the captured image data in the storage unit 140.

The detection control unit 156 detects an operation by the user U1 on the HMD 1A, based on an operation signal output by the operation unit 170. Further, the detection control unit 156 controls detection of various sensors mounted on the HMD 1A. The detection control unit 156 acquires detected values of various sensors input from the FPGA 194. The detection control unit 156 may perform detection for a surrounding environment of the HMD 1A, based on the detected values of the various sensors. For example, the detection control unit 156 detects the brightness around the HMD 1A from an image captured by the camera 61 or a detected value of the illumination sensor 65.

The detection control unit 156 detects the sight line direction of the user U. For example, the detection control unit 156 detects an image of each of the right eye RE and the left eye LE of the user U from an image captured by an inner camera 68. Specifically, reflected light reflected on the pupil or the surface of the eyeball of the right eye RE and the left eye LE is detected from the captured image, and thus, the sight line direction can be detected by utilizing a known technology. A sight line detection unit 158 may detect the sight line direction of the user U by detecting an orientation of the head of the user U from the image captured by the camera 61. Further, the sight line detection unit 158 may detect the sight line direction based on both the sight line direction detected from the image captured by the camera 61 and the sight line direction detected from the image captured by the inner camera 68. The sight line direction detected by the sight line detection unit 158 may be an orientation of each of the right eye RE and the left eye LE and may be a direction in which the user U fixates with both the right eye RE and the left eye LE.

Further, the detection control unit 156 detects an operation from a gesture operation by the user U1. The gesture operation which is also referred to as an action user interface (UI) is an operation by which the user U1 moves an indication body or an operation by which the user U1 shapes the indication body to a specified shape, and these operations are optically detected by the HMD 1A. The indication body is a part of the body of the user U1, such as a hand, a finger, and a leg, however, the indication body may also be a rod-shaped or ball-shaped device. When the gesture operation is performed within the imaging range of the camera 61, an image of the indication body receiving the operation can be captured by the camera 61. The detection control unit 156 extracts an image of the indication body from captured image data of the camera 61 by a pattern recognition process and the like and evaluates, from the extracted image, the shape of the indication body and a change in the shape and the position of the indication body. When the evaluated shape of the indication body and the change in the shape and the position of the indication body are conform to the aspects of a pre-set gesture operation, the detection control unit 156 detects the operation.

The position detection unit 157 (detection unit) is configured to specify a current position of the HMD 1A based on a detected value of the GPS 115 and to create positional information indicating the current position. Further, the position detection unit 157 causes the communication unit 117 to receive a radio signal from a radio access point (not illustrated) and a radio beacon (not illustrated) arranged at a pre-set position and may specify the position of the HMD 1A based on an ID included in the received signal and a received strength. Further, the position detection unit 157 may use the captured image data of the camera 61 to specify the position of the HMD 1A. For example, the position detection unit 157 may detect, from the captured image data of the camera 61, an image of a marker for detecting a position arranged within the movement range of the HMD 1A and evaluate a relative position between the marker and the image display unit 20A based on the position of the image of the detected marker. In this case, the position of the image display unit 20A can be specified based on a relative position between one or a plurality of markers and the image display unit 20A, and an arrangement position of the marker.

Further, the position detection unit 157 may detect the position from a result of a process in which distance detection and region detection are performed by the distance sensor 64. Further, when the HMD 1A is configured to utilize an encoder for detecting a position, the HMD 1A may utilize a detection result from the encoder to detect the position of the HMD 1A. Further, the position detection unit 157 may detect a position based on sound collected by the microphone 63.

The position detection unit 157 specifies a direction of the image display unit 20A. The position detection unit 157 calculates a direction in which the image display unit 20A is directed, based on at least one of the detected values of the six-axis sensor 235, the magnetic sensor 237, the six-axis sensor 111, and the magnetic sensor 113. The position detection unit 157 calculates a direction of the imaging range of the camera 61, based on the calculated direction and on a known positional relationship between the image display unit 20A and the imaging range of the camera 61.

When the image of the non-display object is included in the captured image data of the camera 61, the non-display information processing unit 158 processes the captured image data. The non-display information processing unit 158 specifies the position of the image of the non-display object in the captured image data and sets a non-display region including the image of the non-display object. The non-display information processing unit 158 performs a process of decreasing a degree of clarity of the non-display region. By this process, the image of the appearance of the non-display object included in the captured image data of the camera 61 is processed not to be viewable or difficult to be viewed. After being processed by the non-display information processing unit 158, the captured image data of the camera 61 is transmitted to the server 200. Thus, captured image data in which the non-display object is clearly reflected is not transmitted to the server 200 and the HMDs 1B and 1C, and thus, the non-display object can be protected.

Further, when the non-display information processing unit 158 has processed the captured image data, the image display unit 20 may perform display based on the processed captured image data. For example, when the image display unit 20 displays an image in real time (which may not be entirely real time and may include a delay) based on the captured image data of the camera 61, the image display unit 20 can be a virtual see-through type display device. In this configuration, when the image display unit 20 displays an image based on the captured image data processed by the non-display information processing unit 158, the user U wearing the image display unit 20 does not also view the non-display information. For example, in a case in which it is appropriate to not allow the user U to view the non-display object, the secrecy of the non-display information can be maintained.

When the non-display information processing unit 158 processes the captured image data of the camera 61, the non-display region is a region to be processed. When the captured image data of the camera 61 is a plane (2D) image, the non-display region is a region within the captured image data and can be expressed by coordinates in the captured image data. Further, the non-display region can be specified as a position and a range with respect to the imaging range of the camera 61. In this case, information indicating the non-display region can be a direction with respect to the optical axis and the angle of view of the camera 61, and a distance or a relative position from an imaging surface of the camera 61. Further, the non-display region may be a relative position or range with respect to the image display unit 20 or the center of the head of the user U wearing the image display unit 20. In this case, the positional relationship between the imaging range of the camera 61 and the non-display region can be specified by using data expressing the imaging range of the camera 61 or the visual field of the user U by the relative position or range with respect to the image display unit 20 or the center of the head of the user U wearing the image display unit 20.

The non-display region is not limited to a plan region. For example, a 3D space including a depth may be set as the non-display region. In this case, the information specifying the non-display region may employ a distance with the image display unit 20 as reference, and/or a direction (angle) with the front direction of the image display unit 20 as reference, for example.

The application execution unit 159 corresponds to a function executing the application program 142 when the main processor 125 executes the operating system 141. The application execution unit 159 executes the application program 142 to achieve various functions of the application program 142. The functions of the application program 142 are as described above, for example. During the execution of the application program 142, the application execution unit 159 utilizes functions of the components of the control unit 150.

Further, the non-display information processing unit 158 utilizes a function of the communication control unit 152 to request the server 200 to transmit the non-display information, receives the non-display information transmitted from the server 200, and causes the storage unit 140 to store the received information as the non-display information 147. For example, when the non-display information 147 corresponding to the position of the HMD 1A detected by the position detection unit 157 is not stored in the storage unit 140, the non-display information processing unit 158 requests the server 200 to transmit the non-display information corresponding to the position of the HMD 1A. Further, in order to maintain the non-display information 147 in an appropriate state, the non-display information processing unit 158 may request the server 200 to transmit the non-display information at a pre-set period or upon notification of an update of the non-display information stored in the server storage unit 210.

Further, the non-display information processing unit 158 requests the server 200 to transmit map data to create the non-display information 147, receives the map data transmitted from the server 200, and causes the storage unit 140 to store the received map data as the map data 146.

The non-display information processing unit 158 has a function of creating the non-display information 147. By this function, the non-display information processing unit 158 can add information about the non-display object to the non-display information 147 stored in the storage unit 140 to update the non-display information 147. Further, the non-display information processing unit 158 may add information about the position of the non-display object to the map data acquired from the server 200 to create the non-display information 147, and store the non-display information 147 into the storage unit 140.

1-4. Operation of HMD

Figure 6:
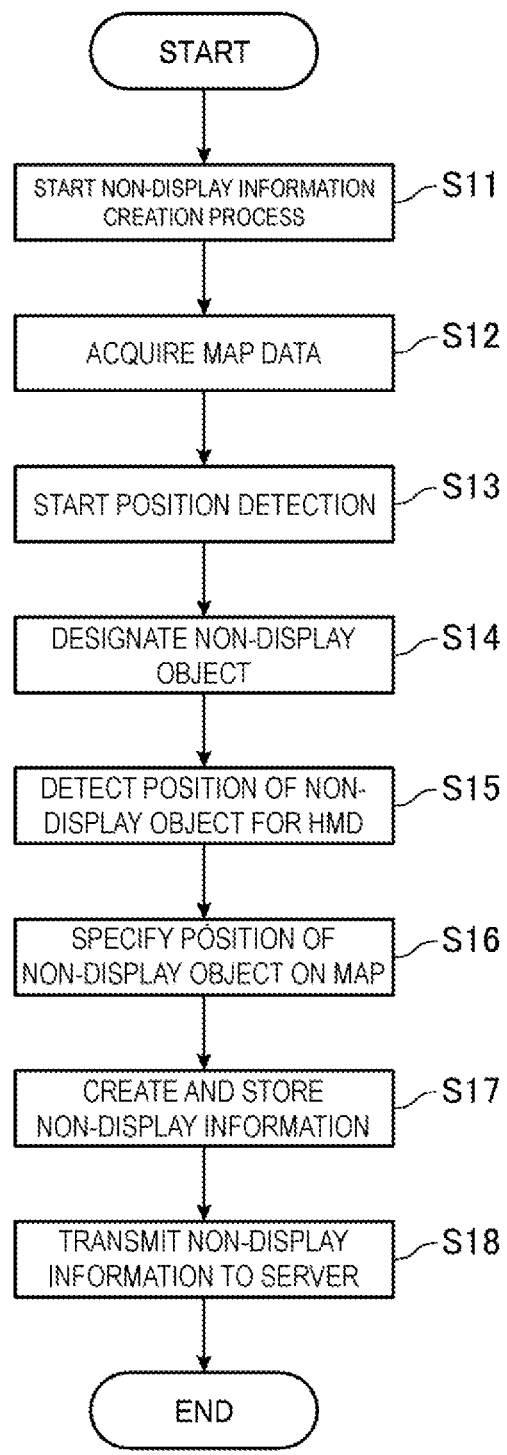
FIG. 6 is a flowchart illustrating an operation of the HMD.

FIG. 6 is a flowchart illustrating an operation of the HMD 1A and illustrates a process of creating the non-display information 147 by the HMD 1A.

The control unit 150 starts a process of creating the non-display information 147 by the non-display information processing unit 158 (step S11) and acquires the map data 146 (step S12). In step S12, the non-display information processing unit 158 may read the map data 146 from the storage unit 140 or may receive the map data from the server 200. For example, the non-display information processing unit 158 may request the server 200 to transmit map data corresponding to a position of the HMD 1A detected by the position detection unit 157 before step S11 and may receive the requested map data from the server 200. Further, as described above, when the control unit 150 executes a SLAM procedure, the control unit 150 can use a template or the like for recording the position of the HMD 1A detected by the HMD 1A as the map data 146.

The control unit 150 controls the position detection unit 157 to start position detection (step S13). The position detection unit 157 detects the position of the HMD 1A and/or the position of the image display unit 20A, and in order to perform the process related with the imaging range of the camera 61, the position detection unit 157 detects the position of the image display unit 20A in step S13.

Here, as a result of the operation to designate the non-display object being performed by the user U1, the detection control unit 156 detects this operation (step S14).

The operation to designate the non-display object is an operation, by the user U1, to point a finger at the position of the non-display object in the visual field through the image display unit 20A, for example. In a case where the HMD 1A provides GUI for moving a pointer to correspond to the operation of the operation pad 14, the user U1 moves the pointer to designate the non-display object. Furthermore, the user U1 may designate the non-display object by way of a gesture operation. A method of designating the non-display object can appropriately include a position designating operation to designate the position overlapping the matter of the non-display object and a region designating operation to designate an outer edge of the non-display object, for example. For example, in the visual field through the image display unit 20A, the user U1 performs the gesture operation to move a finger of the user U1 along a peripheral edge of the matter considered to be the non-display object, and the detection control unit 156 detects an operation position of the gesture operation, as a relative position with respect to the image display unit 20A.

Furthermore, in step S14, the non-display information processing unit 158 may detect a marker allotted to the non-display object from the captured image data of the camera 61 to thereby specify the position of the non-display object. Moreover, the non-display information processing unit 158 may specify the position of the non-display object, based on the positional information transmitted from an external electronic device (for example, a gyro remote control) configured to perform the position detection.

Furthermore, in step S14, the non-display information processing unit 158 may detect the sight line direction of the user U1 and detect, as the non-display object, an object located in the sight line direction or a predetermined range where the sight line direction is present in the center.

The non-display information processing unit 158 detects the relative position with respect to the HMD 1A, in the non-display object designated in step S14 (step S15). The non-display information processing unit 158 may detect the relative position of the non-display object with respect to the image display unit 20A.

The non-display information processing unit 158 specifies the position of the non-display object in the map data 146, based on the position detected in step S15 (step S16). In step S16, the non-display information processing unit 158 may specify the position of the non-display object and the size of the non-display object, and may specify the position of the outer edge of the non-display object. The non-display information processing unit 158 creates the non-display information, based on the position specified in step S16, and stores the same as the non-display information 147 into the storage unit 140 (step S17).

Furthermore, the non-display information processing unit 158 may transmit the non-display information created in step S17 to the server 200 (step S18). The process of step S18 is not essential, but the process has an advantage that a plurality of HMDs 1 can share the non-display information, for example. For example, when the HMD 1B or the HMD 1C downloads the non-display information from the server 200, the same non-display information as the non-display information 147 used by the HMD 1A can be used. This function can be realized when the server 200 includes a function of transmitting the non-display information when the HMDs 1B and 1C request the non-display information.

An example of FIG. 6 is a process in which, in a case where the user U designates the non-display object (step S14), the position of the non-display object is detected and the position of the non-display object is reflected in the map data 146. The invention is not limited thereto, and the information for detecting the appearance of the non-display object from the captured image data of the camera 61 may be created as the non-display information 147.

In this case, the non-display information processing unit 158 extracts the image of the appearance of the non-display object from the captured image data of the camera 61, based on the position detected in step S15, instead of the process of step S16. The non-display information processing unit 158 creates the non-display information for detecting the image of the appearance of the non-display object from the extracted image. For example, the non-display information processing unit 158 may evaluate an image characteristic amount of the image extracted from the captured image data of the camera 61, and may consider the same as the non-display information. Furthermore, the non-display information processing unit 158 may recognize a text in a case where the extracted image contains the text (character), and may create non-display information including the recognized text data.

Furthermore, in another operation example, the non-display information processing unit 158 may extract, instead of the process of step S15, the image of the appearance of the non-display object designated in step S14 from the captured image data of the camera 61. That is, the non-display information for detecting the image of the appearance of the non-display object may be created while omitting the detection of the position of the non-display object. The non-display information in this case may be information similar to that in the above-described example.

Figure 7:
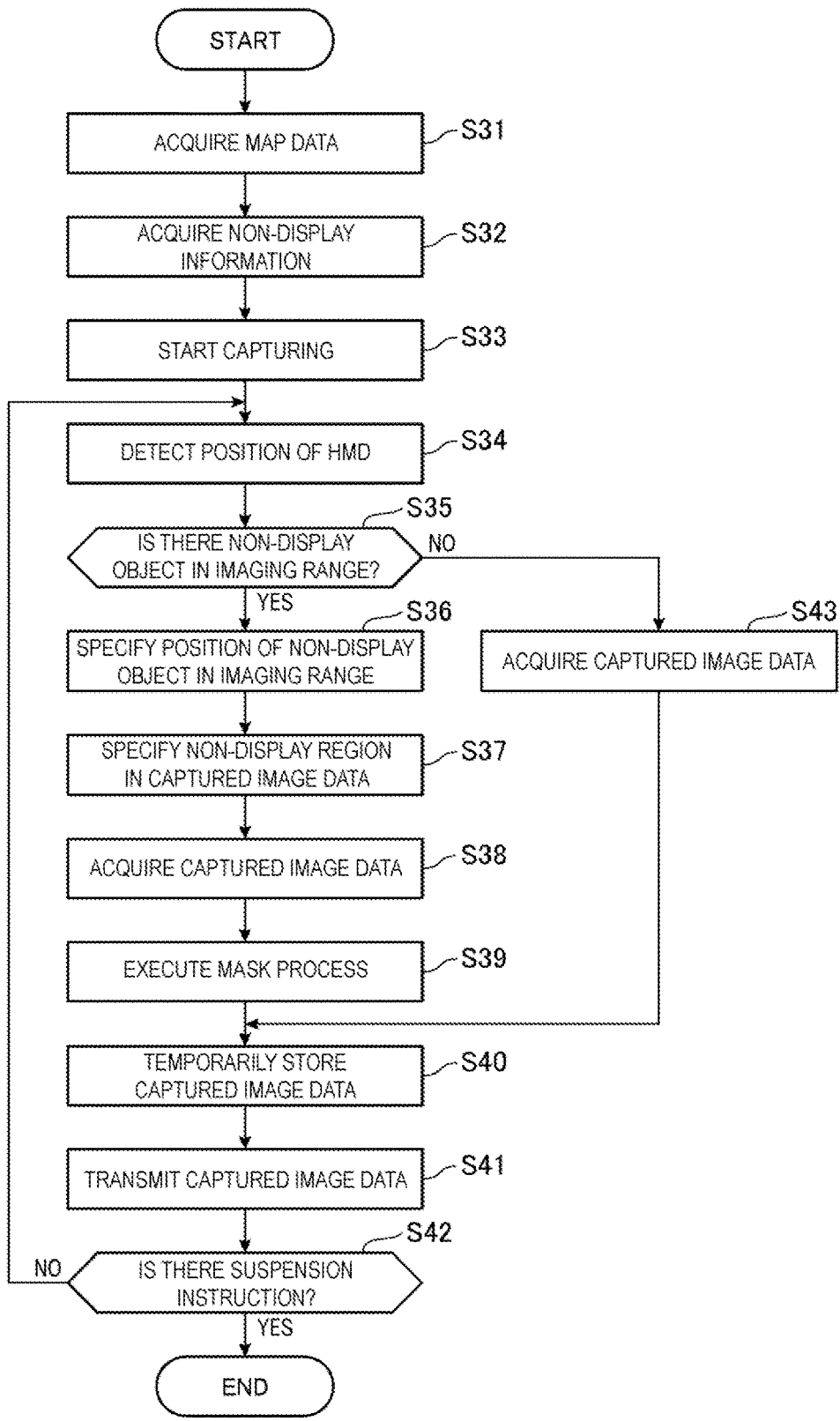
FIG. 7 is a flowchart illustrating an operation of the HMD.

FIG. 7 is a flowchart illustrating an operation of HMD 1A, and illustrates a series of operations where the HMD 1A captures an image by the camera 61 and transmits the captured image data to the server 200.

The control unit 150 acquires the map data 146 by the non-display information processing unit 158 (step S31), and acquires the non-display information 147 (step S32). Here, the non-display information processing unit 158 may acquire the non-display information and the map data from the server 200.

The control unit 150 controls, by the imaging control unit 155, the camera 61 to start capturing (step S33). After the capturing is started, the captured image data is output from the camera 61 to the control unit 150.

The control unit 150 detects, by the position detection unit 157, the position of the image display unit 20A of the HMD 1A (step S34). The control unit 150 controls the non-display information processing unit 158 to determine based on the position detected by the position detection unit 157 and the non-display information 147 whether the non-display object is included in the imaging range of the camera (step S35).

When it is determined that the non-display object is included in the imaging range of the camera 61 (step S35: YES), the non-display information processing unit 158 specifies the position of the non-display object in the imaging range (step S36). Furthermore, the non-display information processing unit 158 specifies the non-display region where the image of the non-display object is included, in the captured image data of the camera 61 (step S37).

The non-display information processing unit 158 acquires the captured image data of the camera 61 (step S38), and executes a mask process of lowering the clarity of the non-display region specified in step S37, on the acquired captured image data (step S39). In a case where the camera 61 outputs the moving image data, the non-display information processing unit 158 applies the mask process to each frame configuring the moving image data.

The non-display information processing unit 158 temporarily stores the captured image data processed in step S39, into the storage unit 140 (step S40).

The control unit 150 controls the communication control unit 152 to transmit the captured image data temporarily stored in step S40, to the server 200 (step S41). In a case where the captured image data output from the camera 61 is the moving image data and is output continuously, the control unit 150 may segment the moving image data for each predetermined time to perform the process of step S41. Further, the control unit 150 may form a buffer memory in a part of a storage region of the storage unit 140 or in the memory 118, and temporarily store the moving image data into the buffer memory in step S40. In this case, the control unit 150 may use streaming transmission to forward the temporarily stored moving image data in step S41.

Furthermore, when determining that there is no non-display object in the imaging range of the camera 61 (step S35: NO), the non-display information processing unit 158 acquires the captured image data (step S43), and shifts to step S40.

The control unit 150 determines whether the suspension is instructed by the operation on the operation unit 170 (step S42), and when the suspension is instructed (step S42: YES), the control unit 150 ends the process. Furthermore, when the suspension is not instructed (step S42: NO), the process returns to step S34.

In step S35, the control unit 150 determines whether the non-display object is included in the imaging range of the camera 61, but the control unit 150 may shift to step S36 even if the non-display object is outside the imaging range of the camera 61. For example, in a case where the imaging range of the camera 61 approaches a predetermined range from the non-display object, or in a case where the imaging range of the camera 61 is closer to the non-display object, the process may shift to step S36. In this case, the image of the non-display object is not included in the captured image data of the camera 61, and thus, the non-display information processing unit 158 may specify, as the non-display region, an end at a side close to the non-display object in the captured image data.

Figure 8:
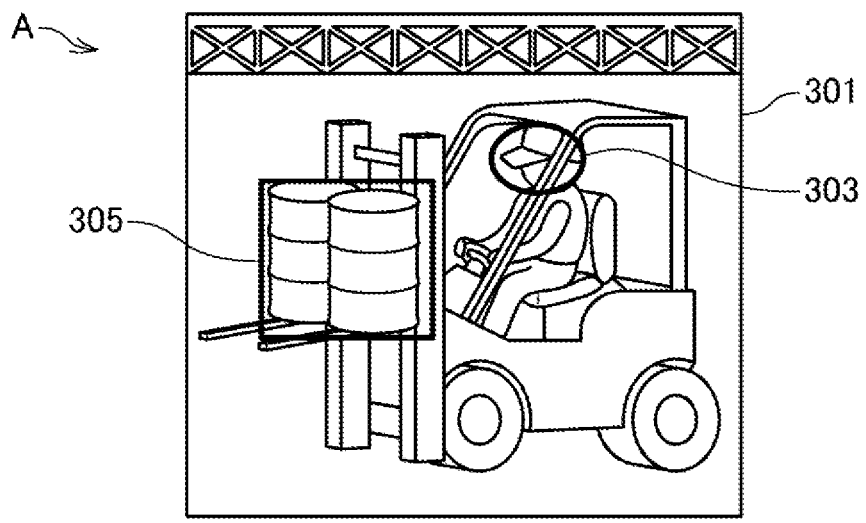
FIG. 8 is an explanatory diagram of a process for the captured image data.
Figure 8:
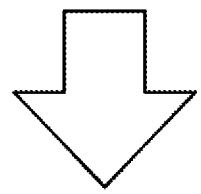
Figure 8:
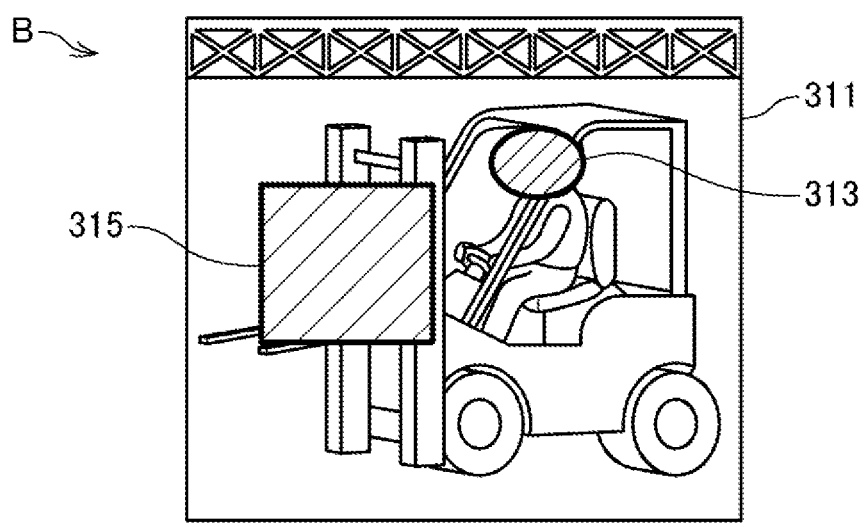

FIG. 8 is an explanatory diagram of a process for the captured image data of the camera 61.

Symbol A in FIG. 8 indicates captured image data 301 as an example of the captured image data of the camera 61, and symbol B indicates processed image data 311 obtained by performing the mask process on the captured image data 301.

The captured image data 301 is data obtained by capturing a working vehicle in a factory, for example. In this example, a face of a person and an item to be carried on the working vehicle are set as a non-display object. The control unit 150 detects the image of a face of a person from the captured image data 301 to specify the corresponding non-display region 303. Furthermore, the control unit 150 detects the image of the working vehicle from the captured image data 301 to specify the non-display region 305 corresponding to a cargo bed of the working vehicle.

The control unit 150 controls the non-display information processing unit 158 to perform the mask process on the non-display regions 303, 305. The mask process is a process of lowering the clarity where a subject captured in the non-display regions 303, 305 can barely be identified.

Specific methods of lowering the clarity in the mask process include the following methods (1) to (3):

(1) Method of pixelating non-display region. The non-display information processing unit 158 performs an image process for pixelating the image of the non-display region to create the captured image data including the mosaic.

(2) Method of filling non-display region. The non-display information processing unit 158 performs a process of filling the non-display region with a pre-set single color, or an image process of superposing a set geometric pattern and the like.

(3) Method of lowering resolution in non-display region. The control unit 150 uses the imaging control unit 155 to control the camera 61 to execute capturing the image at two resolutions by the camera 61. As an example, the camera 61 captures the image at a first resolution (1920×1080) and a second resolution (320×240). A specific numerical value and an aspect ratio of the resolution is arbitrary, but the first resolution needs to be higher in resolution than the second resolution.

In this method, the camera 61 executes alternately the capturing at the first resolution and the second resolution, or in combination thereof. Thus, in a case where the camera 61 outputs the moving image data, frames included in the moving image data include frames at the first resolution and frames at the second resolution. Preferably, the frames at the first resolution and the frames at the second resolution are switched alternately or for each predetermined number of frames. In a typical example, a moving image data of 30 fps includes, per 1 second, 15 frames at the first resolution and 15 frames at the second resolution.

The imaging control unit 155 outputs the moving image data including only the frames at the first resolution, out of the captured image data of the camera 61. After specifying the non-display region in the captured image data, the non-display information processing unit 158 cuts out the image of the non-display region from the frames at the second resolution, and combines and superimposes the cut-out image with the position of the non-display region in the frames at the first resolution. Here, the number of pixels of the image of the non-display region cut out from the frames at the second resolution is smaller than the number of pixels of the non-display region at the first resolution, and thus, the non-display information processing unit 158 combines the image after converting the resolution of the cut-out image. In this case, when the non-display information processing unit 158 performs a process of simply multiplying a predetermined multiple number with the number of pixels, the reduction in resolution of the non-display region can be realized with a light processing load. The non-display information processing unit 158 temporarily stores the moving image data including the combined frames, as the captured image data.

According to the method (3), in a process of transmitting in substantially real time the captured image data of the camera 61 to the server 200, it is possible to restrain a load of the image process and output the moving image data without causing a large delay. In this method, as a result, data mount of the moving image data is compressed, and thus, the data amount is small as compared to a case where a usual real time data transmission is performed, and the moving image data allowing for privacy protection and secret information protection can be delivered in real time. In devices such as the server 200, the HMDs 1B and 1C to which the captured image data is delivered, a region other than the non-display region can be reproduced at a high resolution. Furthermore, the non-display region has a small information amount, and thus, the privacy protection and the secret information protection can be realized. Moreover, as compared to the methods (1) and (2), there is an advantage that the non-display region in the entire captured image data is not conspicuous, and the users U2, U3 do not easily experience an uncomfortable feeling.

Furthermore, in the method (3), in a case where the captured image data (frames of the moving image data) includes an image of the non-display object, the non-display information processing unit 158 may replace the entire frames at a high resolution with the frames at a low resolution. This method is referred to as method (4). According to the method (4), the resolution of the entire frames is decreased, but a device configured to reproduce the moving image data can perform the process of converting the resolution, and thus, the processing load of the non-display information processing unit 158 can be further alleviated. Furthermore, similarly to the method (3), the image of the non-display object can be rendered an image with a low clarity, without causing an uncomfortable feeling.

The "clarity" in the process of lowering the clarity indicates a clarity when the image is viewed by the user U1 or another person; however, this is not limiting. For example, a change in clarity may be a change that may invite a change in processing result when the image is processed by a computer. The process of lowering the clarity may be a process of changing one or more of a resolution, a brightness, a lightness, a chroma, a mosaic, and the like of the image. Furthermore, the process of lowering the clarity may be a process of making unclear a profile included in the image, a process corresponding to an opposite to a so-called edge enhancement process, a process of lessening a gradation of the image, a process of lowering a contrast, a process of lowering a sharpness, and the like. Furthermore, in the process of lowering the clarity, in a whole or a part of the captured image data, a specific brightness or a signal in a frequency range may be increased or decreased to lower the visibility of the image included in the captured image data, or the visibility or the clarity of the profile of the image. Two or more of the processes may be combined for the process of lowering the clarity.

Furthermore, the control unit 150 may measure (detect) the brightness of a usage environment of the HMD 1 by the illumination sensor 65 or the camera 61, and according to the measured brightness, change an imaging condition of the camera 61 or a parameter of a process for the captured image data of the camera 61. The imaging condition of the camera 61 includes a white balance, a shutter speed, a shutter aperture time, an autofocus, a diaphragm value, and the like. When the imaging condition of the camera 61 is modified or adjusted so that the captured image data is made unclear, the clarity may be lowered. Furthermore, the imaging condition of the camera 61 may be modified or adjusted so that the captured image data is made clear, and then, the process of lowering the clarity of the captured image data may be performed.

In FIG. 8, in the processed image data 311, a mask processed portion is illustrated by hatching, but actually, the processes (1) to (3) are performed in the portion.

In the processed image data 311 on which the mask process is performed, a region 313 corresponding to the non-display region 303, and a region 315 corresponding to the non-display region 305 are in a state where the clarity is lowered by the mask process. Thus, while the privacy protection and the protection of the secret information are secured, the captured image data of the camera 61 can be transmitted to the server 200, and the HMDs 1B and 1C from the HMD 1A.

Figure 9:
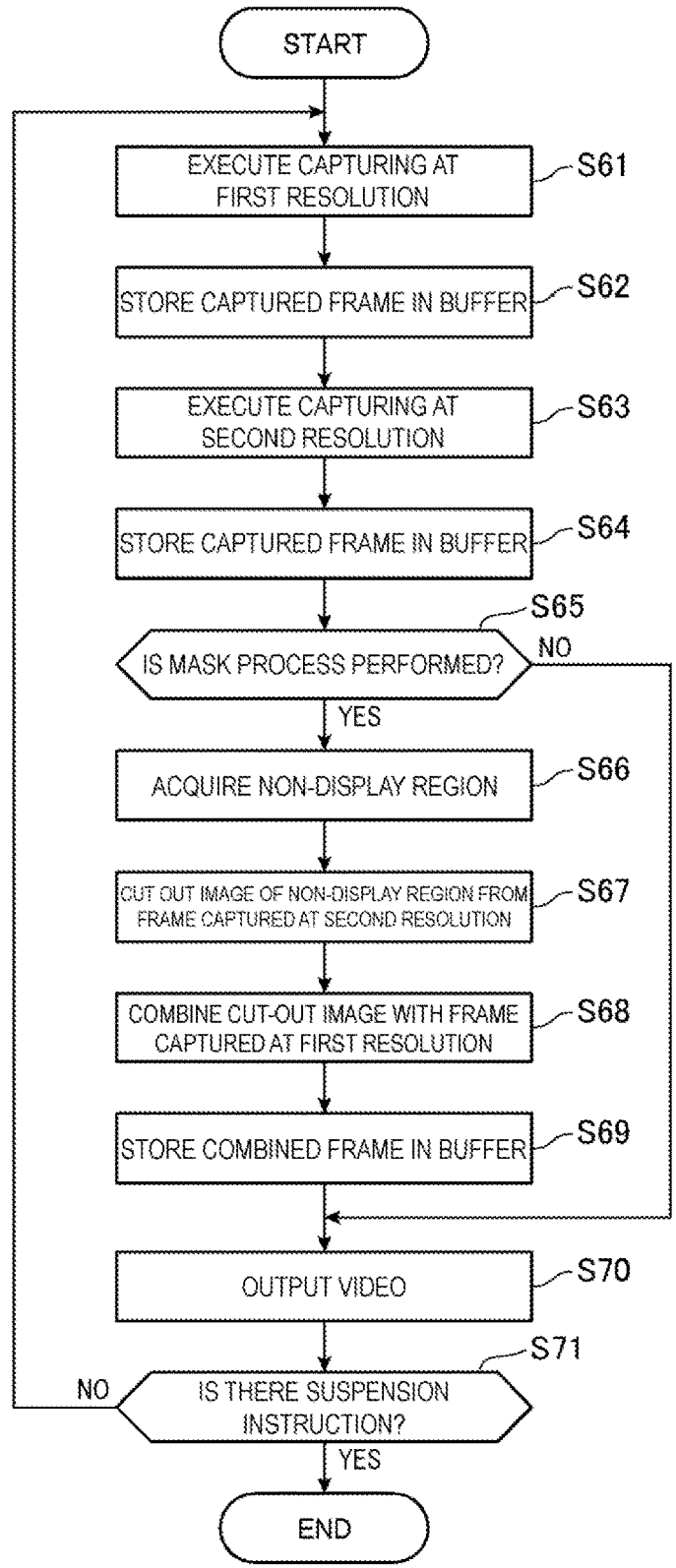
FIG. 9 is a flowchart illustrating an operation of the HMD.

FIG. 9 is a flowchart illustrating an operation of the HMD 1A and illustrates the process (3).

When the imaging control unit 155 controls the camera 61, the camera 61 captures the image at the first resolution (step S61) to store the captured image data into a buffer (step S62). The buffer may be formed in the memory 118 or a storage region of the non-volatile storage unit 121. The camera 61 controls the imaging control unit 155 to execute the capturing at the second resolution (step S63) and store the captured image data into the buffer (step S64).

The non-display information processing unit 158 determines whether to perform the mask process on the captured image data (step S65). When the mask process is performed (step S65), the non-display information processing unit 158 acquires information about the position or the size of the non-display region (step S66), and cuts out the image of the non-display region from the frame captured at the second resolution (step S67). The non-display information processing unit 158 combines the cut-out image with the frame captured at the first resolution (step S68), and stores the combined frame into the buffer (step S69). The non-display information processing unit 158 outputs the moving image data stored in the buffer (step S70).

Furthermore, the non-display information processing unit 158 shifts to step S70 if determining that the mask process is not performed (step S65: NO).

The control unit 150 determines whether the suspension is instructed by the operation on the operation unit 170 (step S71), and when the suspension is instructed (step S71: YES), the control unit 150 ends the process. Furthermore, when the suspension is not instructed (step S71: NO), the process returns to step S61.

As described above, the HMD 1 to which the invention is applied includes the image display unit 20 worn by a user on the head and configured to display an image, and the camera 61 provided in the image display unit 20 and configured to capture an image in a predetermined direction relative to the image display unit 20. The HMD 1 includes a control unit 150 configured to specify a non-display region in an imaging range of the camera 61, perform a process of lowering a clarity of the non-display region on captured image data of the camera 61, and output the processed captured image data.

As a result, by rendering a non-display region a region where a matter not to be captured is caught in the captured image data of the camera 61, a process of lowering a clarity of the non-display region is performed. As a result, it is possible to obtain the captured image data where the clarity of the image of the matter not to be captured is lowered. Therefore, it is possible to appropriately utilize the captured image that may contain the image of the matter not to be captured.

Furthermore, the HMD 1 includes the storage unit 140 configured to store the non-display information 147 for specifying the non-display object. The control unit 150 specifies the non-display region, based on the non-display information 147. As a result, the non-display region on which the clarity lowering process is to be performed is specified based on the non-display information 147 stored in the storage unit 140. As a result, it is possible to appropriately specify the non-display region that may contain the image of the matter not to be captured.

Furthermore, the control unit 150 specifies, as the non-display region, a region where the image of the non-display object is included in the captured image data of the camera 61, in the imaging range of the camera 61. As a result, the region where the non-display object is caught in the captured image data is subject to the clarity lowering process, and thus, it is possible to appropriately conceal and protect the image of the matter not to be captured.

Furthermore, the non-display information 147 stored in the storage unit 140 includes the information indicating at least one of the position and the direction of the non-display object. As a result, based on the information indicating the position and/or the direction of the non-display object, the non-display region can be appropriately specified in the captured image data of the camera 61.

Further, the non-display object is a pre-set matter, and the non-display information 147 includes information for detecting an appearance of the non-display object from the captured image data of the camera 61. In this case, in a case where the appearance of the matter set previously as the non-display object is included in the captured image data, the clarity of the non-display object of the captured image data is lowered, and thus, it is possible to prevent or restrain the non-display object from being viewed.

Further, the HMD 1 includes the communication unit 117, and the control unit 150 receives the non-display information by the communication unit 117 from the server 200 or external device, and stores the same into the storage unit 140. As a result, it is possible to utilize the non-display information 147 appropriate to the process of the captured image data.

Furthermore, the HMD 1 includes the position detection unit 157 configured to detect the position of the image display unit 20. The control unit 150 specifies the position of the image display unit 20 from a detection result of the position detection unit 157, and based on the position of the image display unit 20 and the non-display information 147, detects the non-display region in the captured image data. As a result, it is possible to specify the non-display region that may contain the image of the matter not to be captured to correspond to the position of the image display unit 20. As a result, in a configuration where the camera 61 can move, the captured image that may contain the image of the matter not to be captured can be appropriately utilized.

Furthermore, the HMD 1 includes the map data 146 including at least a part of the range where the image display unit 20 can move, and the control unit 150 may specify the non-display region in the map data 146, and in this case, may utilize the map data 146 to easily specify the non-display region.

Further, the control unit 150 may create the map data 146 of the range where the image display unit 20 can move, and may specify the non-display region in the created map data 146. In this case, the map data 146 is created where necessary, and the map data 146 may be utilized to easily specify the non-display region.

Furthermore, the camera 61 outputs first captured image data captured at a first imaging resolution and second captured image data captured at a second imaging resolution lower than the first imaging resolution. In the process (3) of lowering the clarity of the non-display region, the control unit 150 replaces the non-display region in the first captured image data with an image of a corresponding region in the second captured image data for combination. As a result, by the process of partially replacing the image, the clarity of the non-display region can be lowered.

Furthermore, the camera 61 outputs first captured image data captured at a first imaging resolution and second captured image data captured at a second imaging resolution lower than the first imaging resolution. In the process (4) of lowering the clarity, the control unit 150 replaces the first captured image data including the image of the non-display object with the second captured image data. As a result, by the process of replacing the image, the clarity of the entire captured image including the non-display region can be lowered.

Furthermore, the HMD 1 includes an operation unit 170 configured to receive an operation. In a case where the non-display object is specified in the imaging range of the camera 61 by the operation received by the operation unit 170, the control unit 150 creates the non-display information 147, based on at least one of the position and the direction of the designated non-display object. As a result, the non-display information 147 is created according to the operation, and thus, it is possible to appropriately set a target on which the clarity lowering process is to be performed in the captured image data.

Furthermore, the non-display region is not limited to a plan region. For example, a 3D space including a depth may be set as the non-display region. In this case, information for defining the non-display region in the map data 146 may include a distance with the image display unit 20 being a reference, and/or a direction (angle) with a front direction of the image display unit 20 being a reference, and the like. In this case, based on the captured image data of the camera 61 while the user U1 wearing the image display unit 20 moves, the HMD 1 may perform, while the user U1 moves, a process of changing the clarity in accordance with the distance to the object to be captured and/or the moving speed of the user U1. This results in a benefit that the process of further lowering the clarity may not need to be performed on an image of a matter or a person positioned far from the image display unit 20, where the image has a low visibility in the captured image data, out of the image included in the captured image data of the camera 61, for example.

Furthermore, the display system 100 includes the HMD 1 and the server 200. The server 200 includes the server storage unit 210 configured to store non-display information 147 for specifying a non-display object, and the server communication unit 220 configured to transmit the non-display information 147 stored in the server storage unit 210 to the HMD 1. The HMD 1 includes the image display unit 20 worn by a user on the head, the image display unit 20 being configured to display images, the camera 61 provided in the image display unit 20 and configured to capture an image in a predetermined direction relative to the image display unit 20, and the communication unit 117. Furthermore, the HMD 1 includes the storage unit 140 configured to store the non-display information 147 received by the communication unit 117 from the server 200. Moreover, the HMD 1 includes the control unit 150. The control unit 150 specifies the non-display region in the imaging range of the camera 61, based on the non-display information 147 stored in the storage unit 140, performs the process of lowering the clarity of the non-display region on the captured image data of the camera 61, and outputs the processed captured image data. As a result, when the non-display region is rendered by the HMD 1 a region where a matter not to be captured is caught in the captured image data of the camera 61, a process of lowering a clarity of the non-display region is performed. Thus, it is possible to obtain the captured image data where the clarity of the image of the matter not to be captured is lowered. Furthermore, the HMD 1 can receive the non-display information 147 from the server 200, and thus, the non-display information 147 appropriate for the process of the captured image data can be utilized. Thus, it is possible to appropriately utilize the captured image that may contain the image of the matter not to be captured.

Second Exemplary Embodiment

Figure 10:
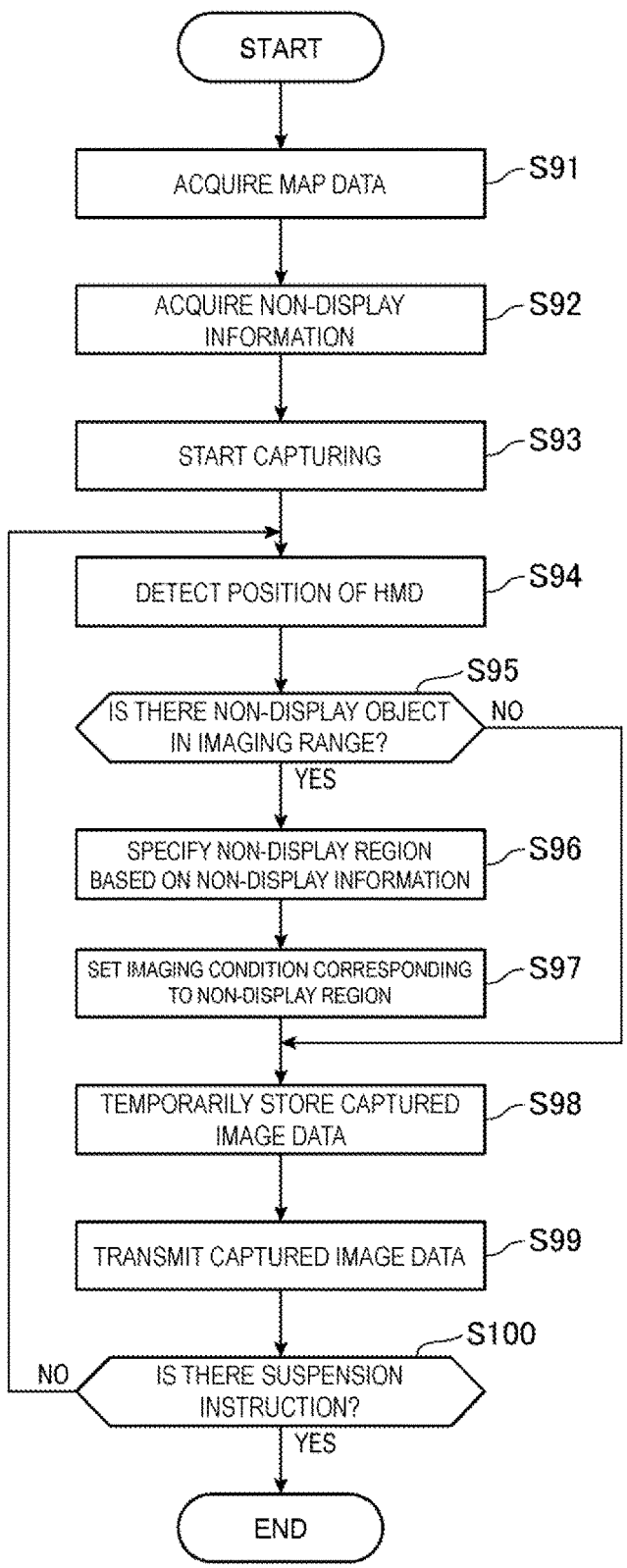
FIG. 10 is a flowchart illustrating an operation of an HMD according to Second Exemplary Embodiment.

FIG. 10 is a flowchart illustrating an operation of HMD 1A in Second Exemplary Embodiment, and illustrates a series of operations where the HMD 1A captures an image by the camera 61 and transmits captured image data to the server 200.

A configuration of the display system 100 and the HMD 1A in Second Exemplary Embodiment is similar to that in First Exemplary Embodiment, and thus, the illustration and the description of the configuration will be omitted.

In Second Exemplary Embodiment, the non-display information 147 includes information indicating a distance from the image display unit 20A to the non-display object.

The control unit 150 acquires the map data 146 by the non-display information processing unit 158 (step S91), and acquires the non-display information 147 (step S92). Here, the non-display information processing unit 158 may acquire the non-display information and the map data from the server 200.

The control unit 150 causes the imaging control unit 155 to control the camera 61 to capture an image (step S93). After the capturing is started, the captured image data is output from the camera 61 to the control unit 150.

The control unit 150 detects, by the position detection unit 157, the position of the image display unit 20A of the HMD 1A (step S94). The control unit 150 controls the non-display information processing unit 158 to determine, based on the position detected by the position detection unit 157 and the non-display information 147, whether the non-display object is included in the imaging range of the camera (step S95).

When it is determined that the non-display object is included in the imaging range of the camera 61 (step S95: YES), the non-display information processing unit 158 specifies the non-display region, based on information about the distance included in the non-display information 147 (step S96). Specifically, the non-display information processing unit 158 acquires the distance from the image display unit 20A to the non-display object included in the imaging range of the camera 61, and considers the region where a region farther than the distance is captured, as the non-display region. In step S96, the non-display object, and a matter located farther than the non-display object and a matter closer to the image display unit 20A relative thereto are to be distinguished.

The imaging control unit 155 sets an imaging condition of the camera 61 corresponding to the non-display region specified in step S97 (step S98). The imaging condition set in step S98 is an imaging condition so that the non-display region is an unclear image, which will be described in detail later.

The non-display information processing unit 158 acquires the captured image data of the camera 61, and temporarily stores the same into the storage unit 140 (step S98).

The control unit 150 controls the communication control unit 152 to transmit the captured image data temporarily stored in step S98, to the server 200 (step S99). In a case where the captured image data output from the camera 61 is the moving image data and is output continuously, the control unit 150 may segment the moving image data for each predetermined time and perform the process of step S99. Further, the control unit 150 may form a buffer memory in a part of a storage region of the storage unit 140 or in the memory 118, and temporarily store the moving image data into the buffer memory in step S100. In this case, the control unit 150 may use streaming transmission to forward the temporarily stored moving image data in step S101.

Further, the non-display information processing unit 158 shifts to step S98 if determining that there is no non-display object in the imaging range of the camera 61 (step S95: NO).

The control unit 150 determines whether the suspension is instructed by the operation on the operation unit 170 (step S100), and when the suspension is instructed (step S100: YES), the control unit 150 ends the process. Furthermore, when the suspension is not instructed (step S100: NO), the process returns to step S94.

In step S95, the control unit 150 determines whether the non-display object is included in the imaging range of the camera 61, but the control unit 150 may shift to step S96 even if the non-display object is outside the imaging range of the camera 61. For example, in a case where the imaging range of the camera 61 approaches a predetermined range from the non-display object, or in a case where the imaging range of the camera 61 is closer to the non-display object, the process may shift to step S96. In this case, the image of the non-display object is not included in the captured image data of the camera 61, and thus, the non-display information processing unit 158 may specify, as the non-display region, an end at a side close to the non-display object in the captured image data.

In the imaging condition set in step S97, a focal point adjustment function (AF: Autofocus) of the camera 61 is used to set such that a focus point of a region farther than the distance indicated by the non-display information 147 is blurred.

Figure 11:
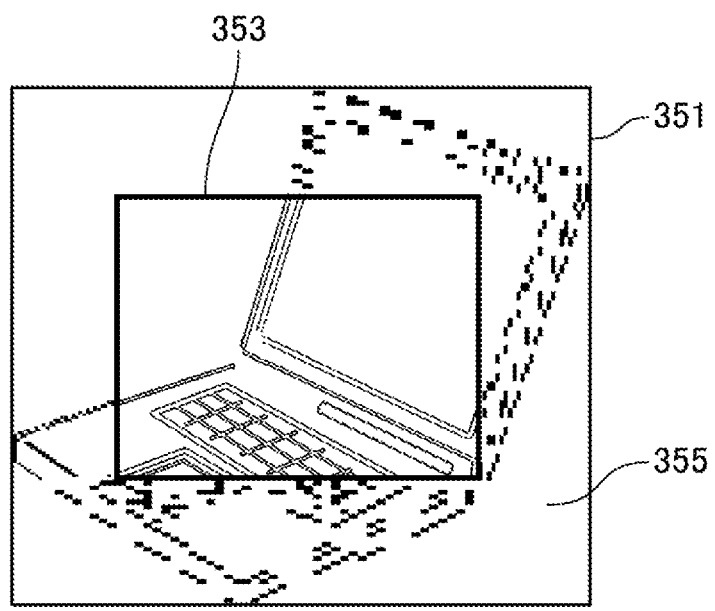
FIG. 11 is an explanatory diagram of an operation of the HMD in Second Exemplary Embodiment.

FIG. 11 is an explanatory diagram of a process for the captured image data of the camera 61.

In the captured image data 351 illustrated in FIG. 11, a region 353 where the distance from the image display unit 20A is closer than the pre-set distance is clearly captured while in a region 355 farther than the predetermined distance, the focal point is not appropriate. Thus, a state where a focal state at a remote site is not appropriate is referred to as "background blur".

As illustrated in FIG. 11, the captured image data 351 with the background blur is an image where an area closer to the image display unit 20A is clear, and thus, this data is useful when the captured image data obtained by capturing an object to be performed in a case where the user U1 performs a process, for example, is transmitted to the HMDs 1B and 1C. Furthermore, the region 355 is unclear, and thus, information about the non-display object is missing and it is possible to maintain the secrecy of the non-display object.

A configuration to generate the background blur can be achieved through adjustment by the AF function and diaphragm adjustment for setting a diaphragm value (so-called F value) of the camera 61. Furthermore, as a configuration where a plurality of cameras 61 are installed and data of the images captured by the plurality of cameras 61 are combined to obtain the captured image data by a single camera, a combining state of the data of the images captured by each camera 61 may be adjusted to realize the background blur corresponding to the diaphragm value.

Furthermore, as another example, a configuration may be acceptable where the image of the non-display region is rendered unclear through an imaging process by the non-display information processing unit 158.

The non-display information 147 may not need to include the exact distance from the image display unit 20A to the non-display object, and for example, the distance may be segmented in an easy-to-understand unit such as 50 cm, 1 m, and 2 m, and may also designated through the operation on the operation unit 170 by the user U1.

Thus, according to the HMD 1 of Second Exemplary Embodiment, the non-display information 147 stored by the storage unit 140 includes the information for designating the distance of the non-display object from the camera 61. As a result, the non-display region can be appropriately specified with the distance from the camera 61 being a reference.

Furthermore, in the process of lowering the clarity of the non-display region, the control unit 150 controls an imaging condition of the camera 61 so that the camera 61 executes the capturing to create the captured image data having a portion different in clarity. As a result, the clarity of the captured image data is lowered by controlling a condition that the camera 61 captures an image, and thus, the imaging process of the captured image data can be simplified or omitted. Thus, it is possible to alleviate a process load.

The invention is not limited to the exemplary embodiment configured as described above. The invention can be implemented in various aspects, as long as the aspects fall within the scope of the invention.

For example, instead of the image display unit 20, for example, another type of image display unit such as an image display unit to be worn like a cap, for example, may be employed. Such an image display unit may include a display unit configured to display images corresponding to the left eye LE of the user U and a display unit configured to display images corresponding to the right eye RE of the user U. Further, the display apparatus according to the invention may be configured as a head-mounted display to be mounted on a vehicle such as a car or an airplane. The head-mounted display apparatus according to the invention may be also configured as a head-mounted display built into a body protective gear such as a helmet. In such a case, a portion for positioning the device with respect to the body of the user U, and a portion positioned with respect to the portion described earlier can be a mounting section of the head-mounted display apparatus.

Further, the controller 10 and the image display unit 20 may be configured as one part, and worn by the user U on the head. Moreover, a portable electronic device including a note-type computer, a tablet-type computer, a game console, a portable phone device, a smart phone, and a portable media player, as well as other dedicated devices and the like may be employed as the controller 10.

Furthermore, in the exemplary embodiment, the configuration where the image display unit 20 and the controller 10 are separated and coupled via the coupling cable 40 is described; however, a configuration may be possible where the controller 10 and the image display unit 20 are coupled via a radio communication line.

Furthermore, as an optical system for guiding image light to the eyes of the user U1, the right light-guiding plate 26 and the left light-guiding plate 28 may employ a half mirror, and may also employ a diffraction grating, a prism, and the like. Furthermore, the image display unit 20 may employ a holography display unit.

Furthermore, in the exemplary embodiment, the configuration is described where the image display unit 20 generates image light by the OLED units 221, 241; however, the invention is not limited thereto. The configuration is illustrated as an example where the OLED units 221, 241 include an OLED panel and an OLED drive circuit configured to drive the OLED panel. Here, the OLED panel is a light emission type display panel including light-emitting elements configured to emit light beams, respectively, by organic electro-luminescence. As a more specific example, a configuration is described where the OLED panel includes a plurality of pixels, each including an R element, a G element, and a B element, arranged in a matrix. As a modification, the image display unit may be configured as a video element where the right display unit 22 and the left display unit 24 each include an OLED panel as a light source unit and a modulation element configured to modulate the light output from the light source unit to output image light including a plurality of color light beams. Thus, when the right display unit 22 and the left display unit 24 utilize a projection optical system, a light guide plate, and the like to guide the image light modulate by the modulation element to an eye of a user, it is possible to realize a configuration where the user is caused to recognize the virtual image. In the image display unit of the modification, in a modulation device configured to modulate the light output from the OLED panel, a transmissive liquid crystal panel may be employed, instead of the transmissive liquid crystal panel, a reflective liquid crystal panel may be employed, and a digital micromirror device may be employed. The light source may be a laser light source, and may also be an LED. Furthermore, the image display unit 20 may be a laser retinal projection-type HMD of laser scanning scheme, for example.

Such a configuration may be adopted that at least some of the functional blocks illustrated in the block diagram are achieved with hardware, or achieved together with hardware and software and a configuration is not limited to the arrangement of the independent hardware resource illustrated in the drawings. Furthermore, programs to be executed by the control unit 150 may be stored in a non-volatile storage unit 121 or in another storage device (not illustrated) in the control unit 10. Furthermore, such a configuration may be adopted that programs stored in external devices may be acquired via the USB connector 19, the communication unit 117, the external memory interface 186 and the like to be executed. A duplicate of a configuration formed in the controller 10 may be formed in the image display unit 20. For example, a processor similar to the main processor 125 may be arranged in the image display unit 20, or the main processor 125 included in the controller 10 and the processor of the image display unit 20 may be configured to perform separate functions.

The present application is based on and claims priority from JP Application Serial Number 2018-006080, filed Jan. 18, 2018, the disclosure of which is hereby incorporated by reference herein in its entirety.

What is claimed is:

1. A head-mounted display apparatus, comprising:
a display unit worn by a user on a head and configured to display an image;
an imaging unit provided on the display unit and configured to capture a captured image in a predetermined direction relative to the display unit;
a control unit configured to specify a non-display region in an imaging range of the imaging unit, perform a process of lowering a clarity of the non-display region on captured image data of the imaging unit, and output the processed captured image data;
a detection unit configured to detect a shape of a non-display object in the captured image; and
a storage unit configured to store non-display information for specifying a pre-set non-display object, the non-display information including a shape of the pre-set non-display object, wherein
the control unit determines whether the detected shape conforms to the shape of the pre-set non-display object,
the control unit specifies the non-display region based on the non-display information and based on whether the detected shape conforms to the shape of the pre-set non-display object,
the control unit sets the non-display region with a 3D space including depth, and
the non-display information stored in the storage unit includes information indicating a direction of the non-display object relative to the display unit and a distance between the non-display object and the display unit.

2. The head-mounted display apparatus according to claim 1, wherein
the control unit specifies, as the non-display region, a region where an image of the non-display object is included in the captured image data of the imaging unit, in the imaging range of the imaging unit.

3. The head-mounted display apparatus according to claim 1, wherein
the non-display information stored in the storage unit includes information for specifying a distance of the non-display object from the imaging unit.

4. The head-mounted display apparatus according to claim 1, wherein
the non-display information stored in the storage unit includes information for detecting an appearance of the non-display object from the captured image data of the imaging unit.

5. The head-mounted display apparatus according to claim 1, comprising:
a communication unit, wherein
the control unit receives the non-display information by the communication unit from an external device, and stores the received non-display information into the storage unit.

6. The head-mounted display apparatus according to claim 1, comprising:
a detection unit configured to detect a position of the display unit, wherein
the control unit specifies a position of the display unit from a detection result of the detection unit, and based on the position of the display unit and the non-display information, detects the non-display region in the captured image data.

7. The head-mounted display apparatus according to claim 1, wherein
map data is provided including at least a part of a range where the display unit is capable of moving, and
the control unit specifies the non-display region in the map data.

8. The head-mounted display apparatus according to claim 7, wherein
the control unit creates the map data of the range where the display unit is capable of moving, and specifies the non-display region in the created map data.

9. The head-mounted display apparatus according to claim 1, wherein
the imaging unit outputs first captured image data captured at a first imaging resolution and second captured image data captured at a second imaging resolution lower than the first imaging resolution, and
in a process of lowering a clarity of the non-display region, the control unit replaces the non-display region in the first captured image data with an image of a corresponding region in the second captured image data.

10. The head-mounted display apparatus according to claim 1, wherein
the imaging unit outputs first captured image data captured at a first imaging resolution and second captured image data captured at a second imaging resolution lower than the first imaging resolution, and
in a process of lowering a clarity of the non-display region, the control unit replaces the first captured image data including an image of the non-display object with the second captured image data.

11. The head-mounted display apparatus according to claim 1, wherein
in a process of lowering a clarity of the non-display region, the control unit controls an imaging condition of the imaging unit so that the imaging unit executes capturing to create captured image data having a portion different in clarity.

12. The head-mounted display apparatus according to claim 1, comprising:
an operation unit configured to receive an operation, wherein
in a case where the non-display object is specified in the imaging range of the imaging unit through the operation received by the operation unit, the control unit creates the non-display information, based on at least one of a position of the specified non-display object and the direction of the specified non-display object.

13. A display system, comprising:
a head-mounted display apparatus; and
a server, wherein
the server includes:

a server storage unit configured to store non-display information for specifying a pre-set non-display object; and a transmitting unit configured to transmit the non-display information stored in the server storage unit to the head-mounted display apparatus, the head-mounted display apparatus includes:

a display unit worn by a user on a head and configured to display an image;

an imaging unit provided on the display unit and configured to capture a captured image in a predetermined direction relative to the display unit;

a communication unit;

a detection unit configured to detect a shape of a non-display object in the captured image;

a storage unit configured to store the non-display information received by the communication unit from the server, the non-display information including a shape of the pre-set non-display object; and a control unit configured to specify a non-display region in an imaging range of the imaging unit, based on the non-display information stored in the storage unit, perform a process of lowering a clarity of the non-display region on captured image data of the imaging unit, and output the processed captured image data, the control unit determines whether the detected shape conforms to the shape of the pre-set non-display object, the control unit specifies the non-display region based on the non-display information and based on whether the detected shape conforms to the shape of the pre-set non-display object, the control unit sets the non-display region with a 3D space including depth, and the non-display information stored in the storage unit includes information indicating a direction of the non-display object relative to the display unit and a distance between the non-display object and the display unit.

14. The display system according to claim 13, the head-mounted display apparatus further including an operation unit configured to receive an operation, wherein in a case where the non-display object is specified in the imaging range of the imaging unit through the operation received by the operation unit, the control unit creates the non-display information based on at least one of a position of the specified non-display object and the direction of the specified non-display object.

15. A method of controlling a head-mounted display apparatus including a display unit worn by a user on a head and configured to display an image, comprising:

capturing, by an imaging unit provided in the display unit, a captured image in a predetermined direction relative to the display unit;

specifying a non-display region with a 3D space including depth in an imaging range of the imaging unit, performing a process of lowering a clarity of the non-display region on captured image data by the imaging unit, and outputting the processed captured image data;

detecting a shape of a non-display object in the captured image;

storing non-display information for specifying a pre-set non-display object, the non-display information including a shape of the pre-set non-display object; and determining whether the detected shape conforms to the shape of the pre-set non-display object wherein specifying the non-display region is based on the non-display information and based on whether the detected shape conforms to the shape of the pre-set non-display object, and the stored non-display information includes information indicating a direction of the non-display object relative to the display unit and a distance between the non-display object and the display unit.

16. The method according to claim 15, further comprising:

receiving an operation by an operation;

specifying the non-display object in the imaging range of an imaging unit through the operation received by the operation unit; and creating the non-display information based on at least one of a position of the specified non-display object and the direction of the specified non-display object.

* * * * *